United States Patent [19]

Jenkins

[11] 4,047,157
[45] Sept. 6, 1977

[54] SECONDARY STORAGE FACILITY FOR DATA PROCESSING

[75] Inventor: Stephen R. Jenkins, Acton, Mass.

[73] Assignee: Digital Equipment Corporation, Maynard, Mass.

[21] Appl. No.: 438,952

[22] Filed: Feb. 1, 1974

[51] Int. Cl.² .............................................. G06F 3/00
[52] U.S. Cl. .................................................. 364/900
[58] Field of Search .................................... 340/172.5

[56] References Cited

U.S. PATENT DOCUMENTS

| | | | |
|---|---|---|---|
| 3,566,363 | 2/1971 | Driscoll, Jr. | 340/172.5 |
| 3,566,364 | 2/1971 | Hauck | 340/172.5 |
| 3,787,820 | 1/1974 | Sherman | 340/172.5 |
| 3,812,469 | 5/1974 | Hauck et al. | 340/172.5 |
| 3,818,459 | 6/1974 | Vrablik | 340/172.5 |
| 3,820,085 | 6/1974 | Zelinski | 340/172.5 |

Primary Examiner—Charles E. Atkinson
Attorney, Agent, or Firm—Cesari and McKenna

[57] ABSTRACT

A controller for use in a data processing system for coupling a direct access storage element to the system. The controller contains a control path for routing control information from the system to various circuits in the controller and designated storage elements to enable a transfer of data stored on the medium over a data path in the controller. The controller data path also couples the medium to the system and includes a switching network which permits the data to be selectively coupled to or from one of two separate system buses. Control information routed to the controller identifies the system to be involved in a transfer and routing circuits in the controller provide the connection between the controller and designated systems.

22 Claims, 23 Drawing Figures

FIG. 20A

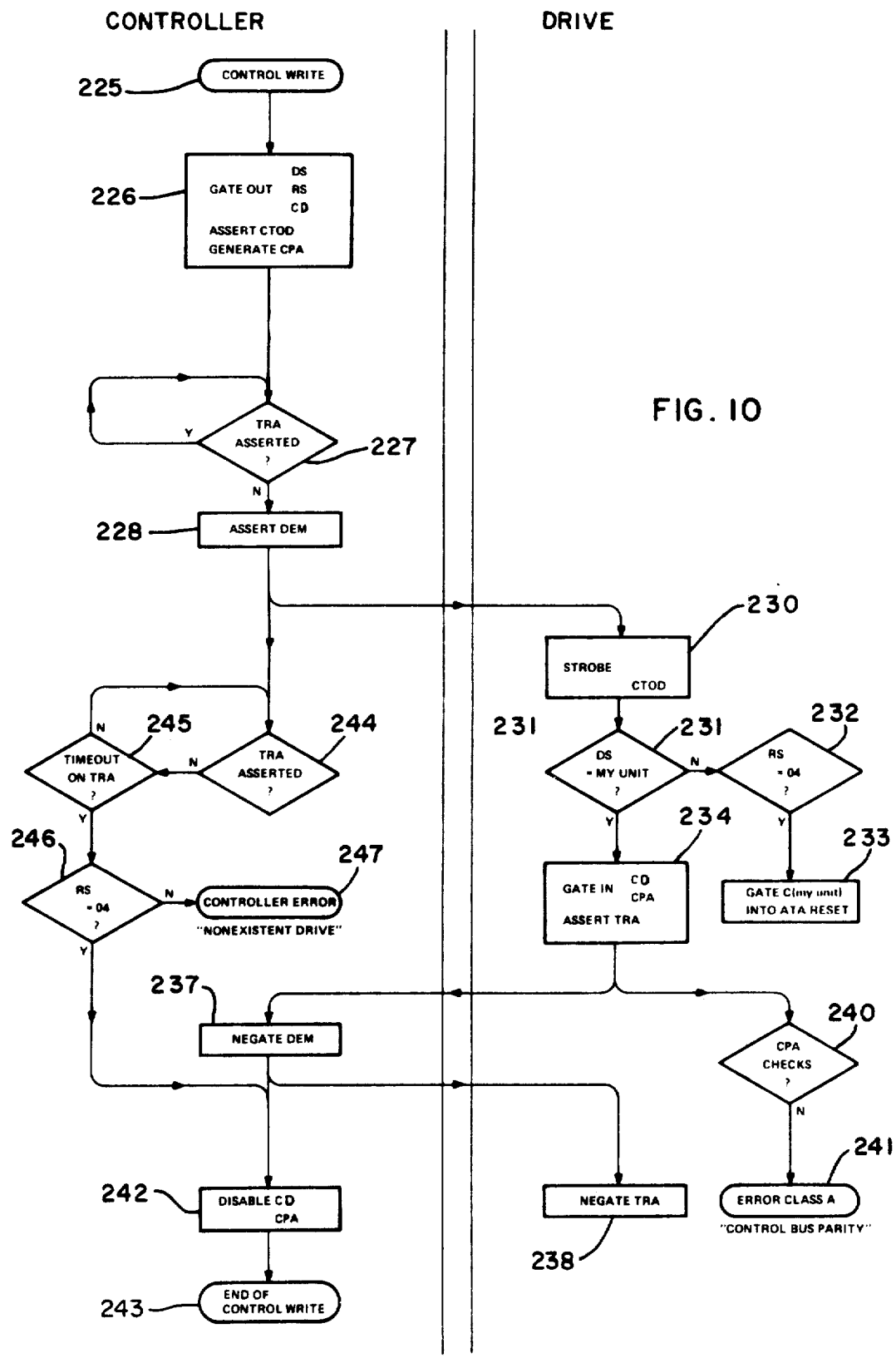

SECONDARY STORAGE FACILITY FOR DATA PROCESSING

BACKGROUND OF THE INVENTION

This invention generally relates to data processing systems and more specifically to secondary storage facilities connected in such systems.

Secondary storage facilities comprise elements which are not an integral part of a central processing unit and its random access memory element, but which are directly connected to and controlled by the central processing unit or other elements in the system. These facilities are also known as "mass storage" elements and include magnetic tape memory units, disk units and drum units, for example.

These facilities are also termed "sequential access storage units" because the information stored in one of these unit becomes available, or is stored, only in a "one-after-the-other" sequence, whether or not all the information or only some of it is desired. For example, it is usual practice to retrieve information from a disk unit on a "sector-by-sector" basis, even though only one of several information records in a sector is needed. Similarly, a physical record on a tape is analagous to a sector on a disk and a complete physical record may be retrieved even though it may contain more than one relevant information record.

These devices also are known as "serial storage devices". In a serial storage device, time and sequential position are factors used to locate any given bit, character, word or groups of words appearing one after the other in time sequence. The individual bits appear or are read serially in time.

In modern data processing systems a secondary storage facility includes a controller and one or more drives connected thereto. The controller operates in response to signals from the data processing system, usually on an input/output bus which connects together other elements in the system including the central processing unit. A drive contains the recording medium (e.g., tape or a rotating disk), the mechanism for moving the medium, and electronic circuitry to read data from or store data on the medium and also to convert the data between serial and parallel formats.

The controller appears to the rest of the system as any other system element on the input/output bus. It receives commands over the bus which include command information about the operation to be performed, the drive to be used, the size of the transfer, the starting address on the drive for the transfer, and the starting address in some other system element, such as a random access memory unit. The controller converts all this command information into the necessary signals to effect the transfer between the appropriate drive and other system element. During the transfer itself, the controller routes the data to or from the appropriate drive and from or to the input/output bus or a memory bus.

Prior controllers usually have only one connection to the input/output, memory or equivalent bus in a data processing system. However, random access memories now have connections or "ports" for two independently operating buses. With these "dual-port" memory units, greater operating efficiency is possible. For example, one "port" might be connected to a first bus to which a central processing unit and one or more input/output units connect. The second port might then connect to a second bus in turn connected to a seconday storage facility and other input/output units. With such a configuration, a transfer could occur between the memory and secondary storage port while another transfer was being made simultaneously between the central processing unit and another unit connected to the first bus.

From another viewpoint, secondary storage facilities can transfer large blocks of data to or from memory units in short periods of time. Normally they transfer data only over an input/output bus which handles all transfers to or from input/output devices including secondary storage facilities. Data transfers to or from secondary storage facilities over such a bus can still require such a large portion of the total time available on the bus that the overall efficiency of the system may be reduced because these transfers may prevent others from being made. Alternatively, the system can be arranged to devote a greater proportion of time to central processing unit transfers, but only by sacrificing the transfer rate to or from the secondary storage facility. Thus, as usage of such a system increases, it can become inefficient even though there is a second bus which might be used to handle transfers between the secondary storage facility and the random access memory unit.

Therefore, it is an object of this invention to provide a secondary storage facility which is capable of increased operating efficiency.

Another object of this invention is to provide an improved facility which can transfer data over each of two independent buses in a data processing system.

SUMMARY

In accordance with this invention, a controller in a secondary storage facility can transfer data from a recording medium over either of two independent buses in a data processing system. The controller accepts control information over a first bus including a bus selection signal which designates which bus will be used to transfer data. The data passes through a data path in the controller. A switching network in the controller responds to the bus selection signal and routes the necessary address and control signals onto the selected bus and couples the selected bus and data path.

Commands and other information pass over the first bus. While data may also be transferred over the first bus, normally it will be routed over the second bus to or from some other system units, such as a dual-port memory, another data processing system, or an input-output device. Thus, the first bus is only involved in transferring the command information and can be used for transfers simultaneously with a transfer over the second bus involving the secondary storage facility.

This invention is pointed out with particularity in the appended claims. The above and further objects and advantages of this invention may be attained by referring to the following description taken in conjunction with the accompanying drawings.

BRIEF DESCRIPTION OF THE DRAWINGS

FIG. 10 is a flow chart of the operation for storing information in a register shown in FIG. 7;

DESCRIPTION OF ILLUSTRATIVE EMBODIMENTS

I. General Description

Figure 1:
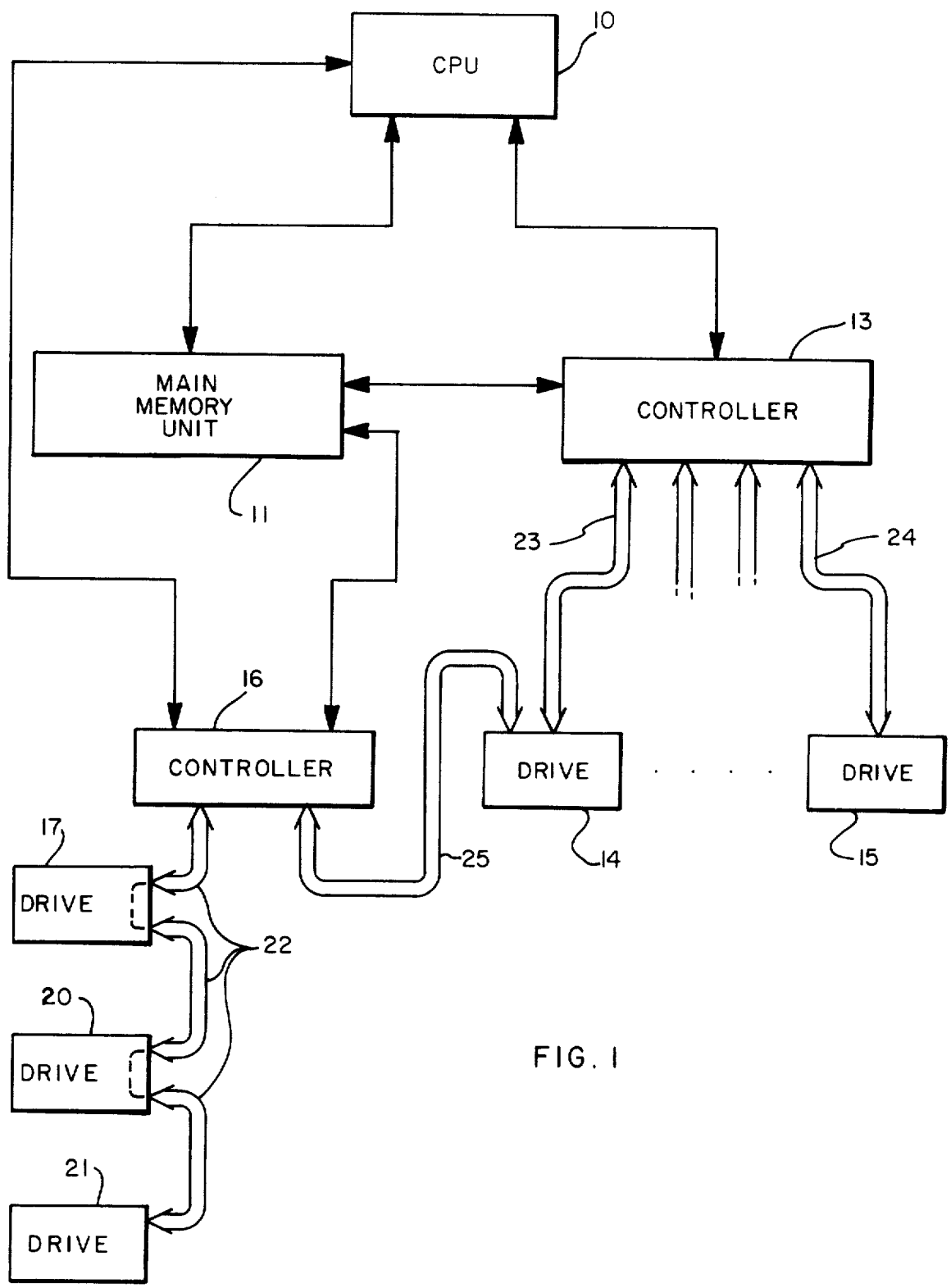
FIG. 1 is a generalized block diagram of a data processing system adapted to use this invention.

FIG. 1 depicts the general organization of a data processing system comprising a central processing unit (CPU) 10 and a main memory unit 11, normally a random access memory unit. Information also may be transferred to or from a secondary storage facility including a controller 13 and several drives, drives 14 and 15 being shown by way of example. Another such storage facility includes a controller 16 and drives 17, 20 and 21. This facility is also coupled to the central processing unit 10 and the main memory unit 11.

As previously indicated, a "drive" includes a recording medium and the mechanical and electrical components for recording data on or reading from the recording medium in the context of this invention. For example, it can comprise a fixed or movable head disk memory unit, a magnetic drum memory unit or a magnetic tape unit, as well as non-mechanically driven memory units. Timing signals derived from the medium normally synchronize data transfers with movement of the medium. A typical drive contains control, status, error and other registers for controlling and monitoring drive operations.

A controller 13 or 16 may be located physically separately from the central processing unit 10 as shown in FIG. 1 or may be an integral part of a central processing unit. Controllers serve as "interfaces" between the central processing unit and the drive. They contain the circuits for exchanging data with either the central processing unit 10 or the main memory unit 11. Buffer registers in the controller 13 or 16 compensate for the usually different transfer rates between the controller and main memory unit 11, on the one hand, and between the controller and drive, on the other hand.

Drives are connected to controllers by means of device buses in several different configurations. If, for example, the controller 16 were connected to drive 17 only, the arrangement would be termed a "single drive" configuration. Actually, as shown in FIG. 1, the drives 17, 20 and 21 are interconnected by a device bus 22 which is threaded from one drive to the next. This is an example of a "daisy-chain" configuration. Device buses 23 and 24 connect drives 14 and 15, respectively, in a "radial" configuration. Drive 14 is linked to the controller 16 by way of a device bus 25; the drive 14 is thus in a "dual controller-single drive" configuration.

It will become apparent from the following discussion that the disclosed facilities are adapted for all these configurations. The user of a system will determine his own specific configuration. It also will become apparent that if drive 14 is one type of magnetic disk memory unit, drive 15 can be another unit of the same type, a magnetic disk memory unit of another type, or even a magnetic tape or magnetic drum unit or other type of sequential access memory. Moreover, drives 17, 20 and 21 could be directly connected to controller 13 without any modification to either the controller 13 or any of the drives.

This interchangeability and resultant flexibility result because each of the device buses 22, 23, 24 and 25 contains a standard set of corresponding conductors for transferring signals, notwithstanding the drive connected to the device bus or the data processing system which is involved. As new drives are developed with improved storage media such as tapes and disks with higher recording density or even of new media, it will only be necessary to have the drive itself conform to the standard set of signals, no new controller development will be necessary.

Figure 2:
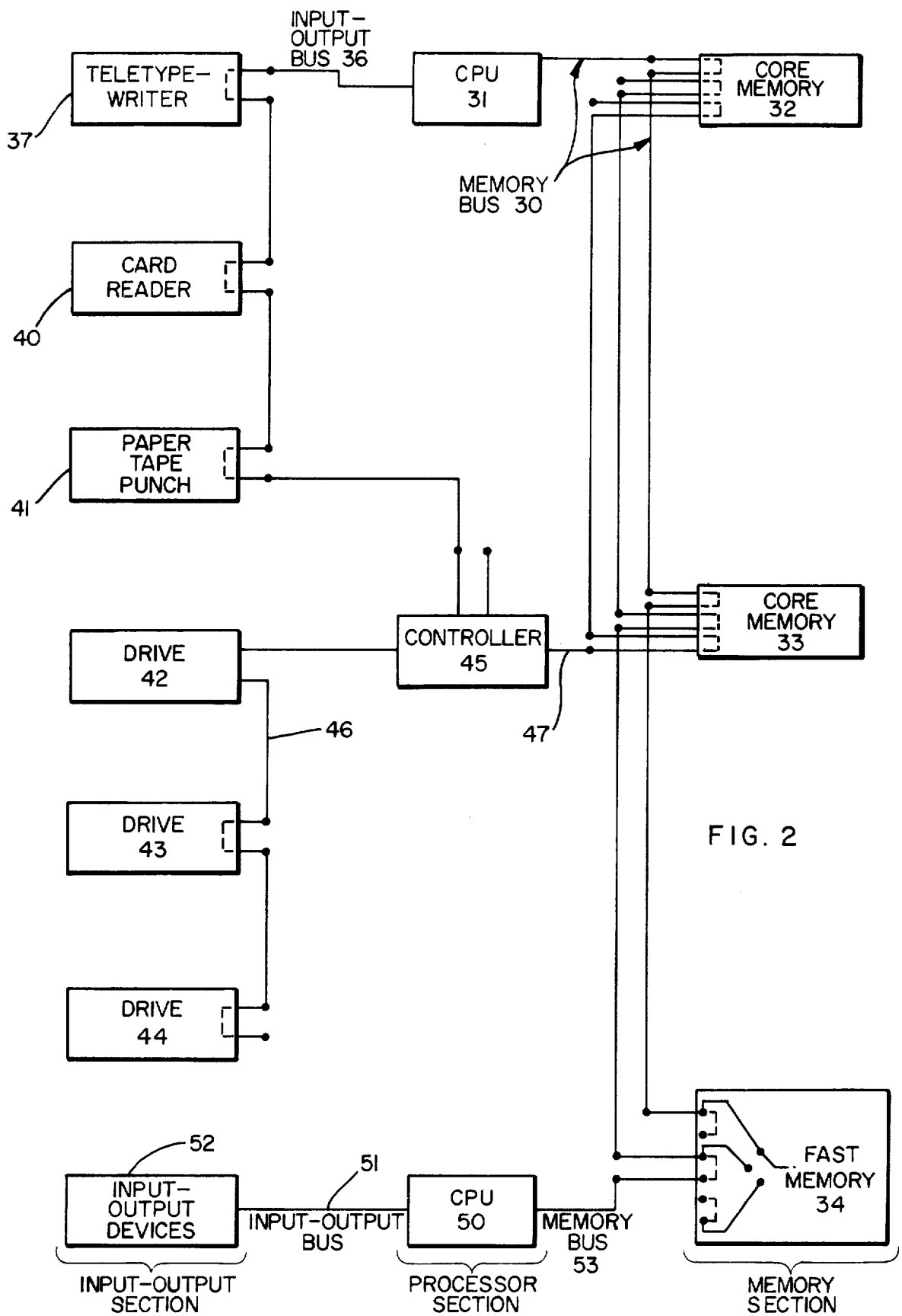
FIG. 2 is a block diagram of one type of data processing system shown in FIG. 1 in which separate memory and input/output buses link elements in the system.
Figure 3:
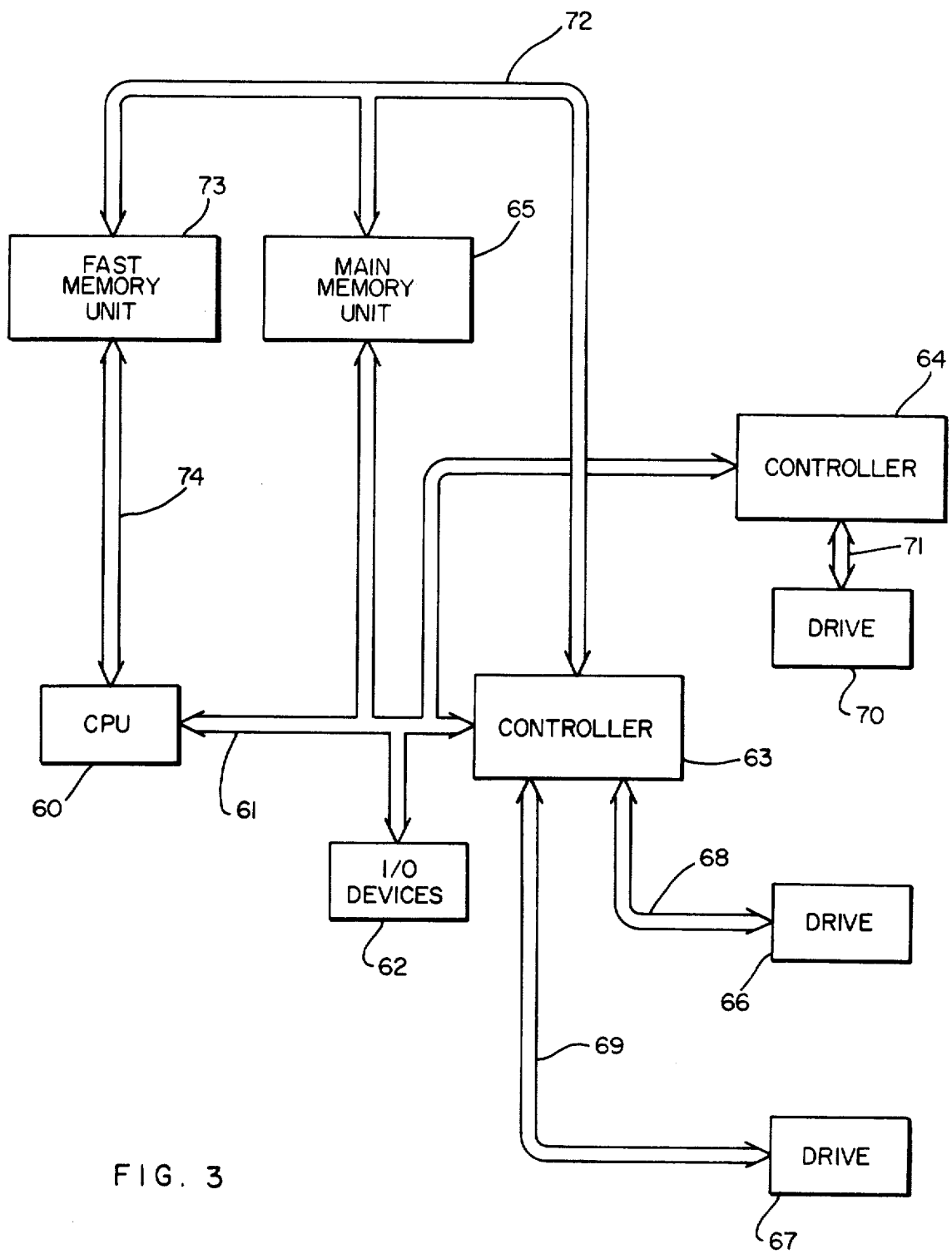
FIG. 3 is a block diagram of another type of data processing system shown in FIG. 1 in which a single bus is common to all elements in the system.

New drives will also be independent of the type of data processing systems to which they connect. FIGS. 2 and 3 depict diverse types of data processing systems. The nature of the data processing system has no effect on the drive itself. Although these two data processing systems form no part of the invention, the fact that they are diverse types of systems emphasizes the flexibility of the disclosed secondary storage facilities. Also, specific examples of data processing systems will facilitate an understanding of the detailed discussion of this invention.

FIG. 2 illustrates a data processing system containing two separate data paths. The system is also segregated into input-output, processor and memory sections. A memory bus 30 connects a first central processing unit (CPU) 31 with a memory section including, for example, a core memory 32, a core memory 33 and a fast or volatile memory 34. An input-output bus 36 connects the central processing unit 31 with several input-output devices such as a teletypewriter 37, a card reader 40, and a paper tape punch 41. The memory bus 30 and the input-output bus 36 carry control, address and data signals in two directions. The signals on each bus are transferred in parallel, as distinguished from serial transmission.

The central processing unit 31 can also control the transfer of data between the memory section and a secondary storage facility. In FIG. 2 this storage facility comprises drives 42, 43 and 44 connected to a controller 45 by a device bus 46 in a daisy-chain configuration. The controller 45 receives control information over the input-output bus 36 to be processed by an asynchronous drive control path within the controller 45. A synchronous data path in the controller may transfer data to the memory bus 30 or, as shown, to a second memory bus 47. Thus, transfers between the secondary storage facility and the memory section occur only with minimum use of the input-output bus 36 and the central processing unit 31 because data can be transferred directly through the controller 45 to the memory section. As also shown in FIG. 2 a second central processing unit 50 connects through an input-output bus 51 to other input-output devices 52. The central processing unit 50 also connects to the memory section through a bus 53, which enables the unit 50 to use the memory units 32, 33 and 34 in common with the processing unit 31 including data supplied to the memory section by the secondary storage facility.

As previously stated, this is an example of a data processing system which has separate input-output and memory buses. In operation, the central processing unit 31 might require some program stored in the drive 42. A second program already stored in the memory section would contain the necessary instructions to transfer a command to the controller 45 over the bus 36 to identify a particular drive, such as the drive 42, the starting location in the drive (e.g., the track and sector numbers in a disk memory unit) and other necessary information, as known in the art. Once the controller 45 receives that information, it retrieves data from the drive 42 and then transfers it to the memory bus 47 directly for storage and subsequent use by the central processing unit 31 or even the central processing unit 50. The controller 45 might also write data onto the bus 36 or even another memory bus under program control. Analogous transfers occur in a system using a common bus to interconnect the system elements. Such a system is shown in FIG. 3 and comprises a central processing unit (CPU) 60 and a first common bus 61. The bus 61 contains address, data and control conductors. It connects the central processing unit 60 in parallel with input-output devices 62 and controllers 63 and 64 associated with two secondary storage facilities.

The system in FIG. 3 includes a main memory unit 65 connected to the bus 61. Data transfers can occur over the bus 61 between the main memory unit 65 and any of the drives 66 and 67 connected to the controller 63 in a radial configuration by device buses 68 and 69, respectively, or a drive 70 connected in a single drive configuration to controller 64 by a device bus 71. These transfers occur over the bus 61 without requiring the CPU 60 to perform an interruption routine.

In accordance with this invention, the controller 63 has an additional connection for another bus 72 which is identical to the bus 61. The bus 72 is coupled to a second part of the main memory 65, which is a "dual-port" memory. This bus 72 also connects to a fast memory 73, which is coupled to the central processing unit 60 through dedicated bus 74.

With this data processing system, the central processing unit 60 can transfer a command to the controller 63 over the bus 61. The controller 63 then can prepare a drive, such as the drive 66 for an operation by transferring control information over the drive control path in the device bus 68. Data can then pass over the synchronous data path in the device bus 68 through the controller 63 and then either onto the bus 61 or, for more efficient operation, over the bus 72 directly into the memory 65 or 73. If the transfer is being made to another one of the input-output devices 62, the data may pass over the bus 61.

The signals over each of the device buses 46 in FIG. 2 and 68, 69 and 71 in FIG. 3 are the same. This means that the controllers 45, 63 and 64 have the same circuitry at their respective device bus connections. The only required differences between the controllers are those necessary for connection to the data processing system buses.

As the drives are connected only to device buses and all device buses are the same, the drive circuits are independent of any particular system. Of course, different data processing systems have different word sizes which can range from eight bits to thirty-six bits or more. Circuit modifications in the controllers or the drives can be made to accomodate these different word sizes. At this point it is sufficient to consider the use of a basic eighteen-bit word. No modification is necessary for a central processing unit using eighteen-bit words. To provide a thirty-six bit word for other data processing systems the controller merely needs to concatenate pairs of eighteen-bit words. Other arrangements can be used when the data processing system word length is not an exact multiple of a drive word length.

II. The Device Bus

Figure 4:
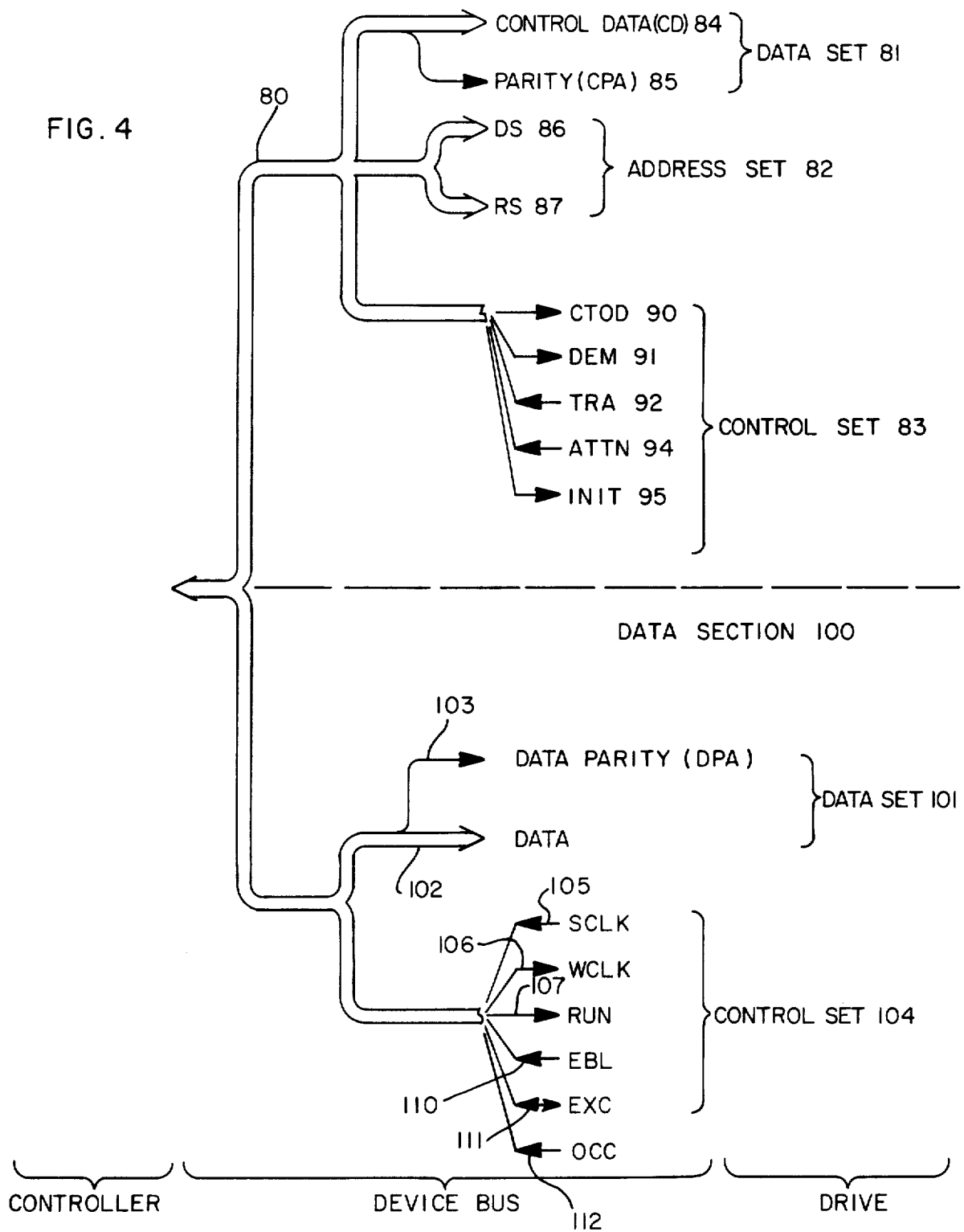
FIG. 4 depicts the interconnection between a drive and controller in accordance with this invention.

To understand the interaction between a controller and device it is helpful to discuss first the specific signals which appear on the device bus and the functions each performs. A device bus, with its signal designations, is shown in FIG. 4; and the same mnemonic identifies a wire or group of wires and the signals they carry. Every device bus has the same constructions. A drive control section 80 contains conductors segregated into a data set 81, an address set 82 and a control set 83. Within the data set 81 there are bidirectional control data (CD) wires 84 for carrying control and status information between a controller and any of its respective drives. A bidirectional CPA wire 85 carries a parity bit. The control information includes commands which control the operation of the drive. Some of the commands initiate data transfers and include READ, WRITE and WRITE CHECK commands. Other commands initiate control operations such as positioning heads in a movable head disk drive, winding a tape in a magnetic tape drive or clearing registers in a drive.

Within the address set 82, there are drive selection (DS) wires 86 and register selection (RS) wires 87. The DS wires 86 carry DS signals from a controller to provide information for selecting a drive for an ensuing transfer of control or status information. A controller also transmits the RS signals. Within the drive identified by the DS signals the RS signals define a specific register which is to be involved in a transfer.

The control set 83 includes a controller-to-drive transfer (CTOD) wire 90. When a controller asserts a CTOD signal (i.e., a logic ONE signal level), the following transfer over the data set 81 is from the controller to the selected register in the selected drive. When the CTOD signal is not asserted, (i.e., is at a logic ZERO signal level), the transfer is from the selected drive register to the controller.

A demand (DEM) wire 91 and a transfer (TRA) wire 92 carry asynchronous timing signals. Specifically, the controller puts a DEM signal onto the wire 91 to initiate a transfer of control information. The selected drive transmits the TRA signal to indicate the receipt of control information or the availability of status information.

Whenever any drive requires some interaction with the controller and data processing system, it transmits an ATTN signal onto a single ATTN wire 94 which is common to all drives. Usually the controller responds by interrupting the data processing system.

An INIT signal on a wire 95 serves as a facility resetting signal. Upon receipt of the INIT signal, a drive immediately terminates its operation, clears all error conditions and becomes available to the controller and system for further operations.

A synchronous data section 100 shown in FIG. 4 carries blocks of data at high transmission speeds between the controller and drives. These blocks of data are carried in response to READ, WRITE and WRITE-CHECK commands previously sent to a controller and its respective drive with related transfers occuring over the control section 80. The data section 100 also serves as a link for control signals which initiate and terminate the block transmissions. Bidirectionally conducting wires in a data set 101 comprise data wires 102 for carrying the data itself and a data parity (DPA) wire 103. A control set 104 includes a SCLK wire 105 and a WCLK wire 106. The drive uses timing signals derived from the recording medium to produce SCLK signals on the SCLK wire 105 to synchronize the reading of data from the data wires 102 and DPA wire 103 when the data moves to the controller. When the data is to be stored in the drive, the controller receives SCLK signals and transmits WCLK signals back to the drive. The WCLK signals control the writing of data onto the recording medium in the device.

A RUN signal controls the initiation of a data transfer and the overall duration of the transfer; it appears on a RUN wire 107. The controller asserts the RUN signal to start a data transfer in accordance with a command which was previously transferred to the drive over the device bus control section 80. Subsequently, circuits in the drive use the RUN signal to determine the time for terminating the transfer. An EBL signal transmitted by the drive on a wire 110 signals the end of a block. Any transfer terminates if, at the end of an EBL signal, the RUN signal is not asserted. Otherwise, the transfer operation continues through the next block. In this connection the term block has a conventional meaning as applied to magnetic tape memory units and is equivalent to a sector as that term is conventionally applied to magnetic disk memory units. Thus, as used in this description, block is used in a generic sense to indicate a conveniently sized group of data bits to be sent as a unit.

A wire 111 in the synchronous data section 100 is a bidirectional wire for carrying exception (EXC) signals. When the drive transmits the EXC signal, some error has occurred during the transmission. This signal remains asserted until the last EBL signal during the transfer terminates. An EXC signal from a controller, on the other hand, causes the drive to terminate any action it was performing in response to a command.

There is also an occupied (OCC) wire 112. Whenever a drive begins to perform a data transfer over the synchronous section 100, the drive transmits an OCC signal to a controller. This positively indicates that a drive connected to that controller is busy with a data transfer.

With this understanding of the signals which appear on a device bus, it is possible to discuss generally the circuits in a controller. Looking first at the synchronous data path in FIG. 5, it will be apparent that only one drive connected to a controller may respond to a READ, WRITE or WRITE-CHECK command at any given time because the data section 100 (FIG. 4) is connected to a all the drives a controller supervises. Data passes from a drive, over a device bus 121 with the construction shown in FIG. 1, through the synchronous data path of FIG. 5 and, in accordance with this invention, to SYSTEM BUS A 120 or to SYSTEM BUS B 400. A reverse operation involving the same route occurs when data passes to a drive. SYSTEM BUS A 120 could correspond to the intpu-output bus 36 in FIG. 2 and SYSTEM BUS B 400, to the memory bus 30 in one arrangement. In FIG. 3, SYSTEM BUS A would correspond to bus 61, SYSTEM BUS B, to bus 72. If one of the two buses also connects to the control path shown in FIG. 6, such as the bus 61 in FIG. 3, that bus is, for purposes of a data transfer, SYSTEM BUS A 120. In the following discussion only, buses 120 and 400 are discussed. Further, reference numerals used to designate wires in FIG. 4 are applied to corresponding wires in the other FIGURES.

Incoming data from either SYSTEM BUS A 120 or SYSTEM BUS B 140 in response to a WRITE command or the data section 101 of a device bus 121 in response to a READ or WRITE-CHECK command is loaded into an input buffer 122 for transfer into a storage facility 123. When the facility 123 is filled, the first word in is loaded into an output buffer 124. A data path control circuit, generally 126, then either routes the data onto the device bus 121 for transfer to the device or onto one of the system buses 120 or 400 for transfer to a designated location in the data processing system. A transfer control circuit 401 selects a bus as described later. The controller also contains the necessary circuits for generating the appropriate address signals to identify a memory location which either stores the data to be transferred to the controller or which is to receive the data from the drive.

III. Drive Control Path

Figure 6:
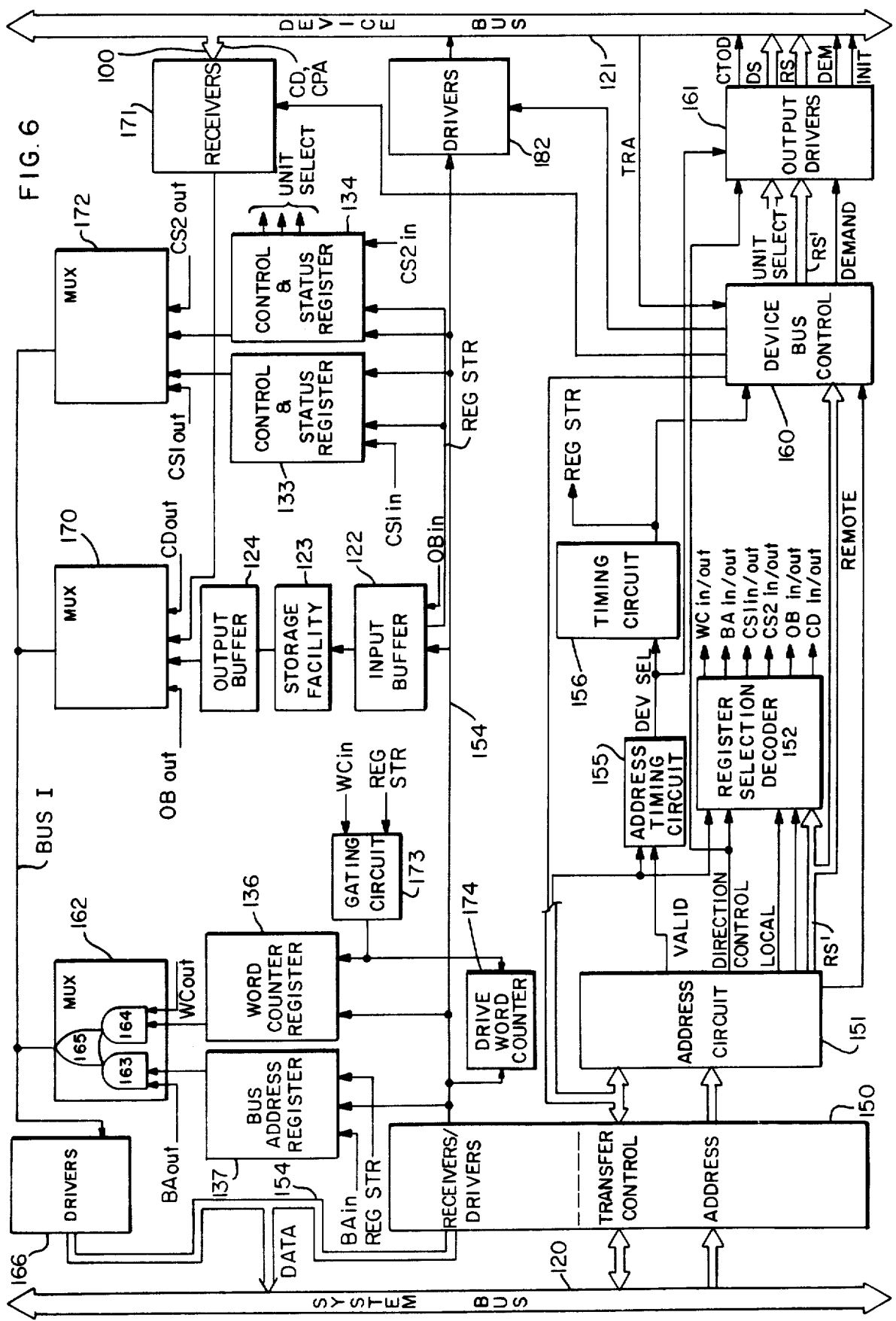
FIG. 6 is a block diagram of an asynchronous drive control path in a controller as adapted for connection to a system as shown in FIG. 2 or 3.
Figure 7:
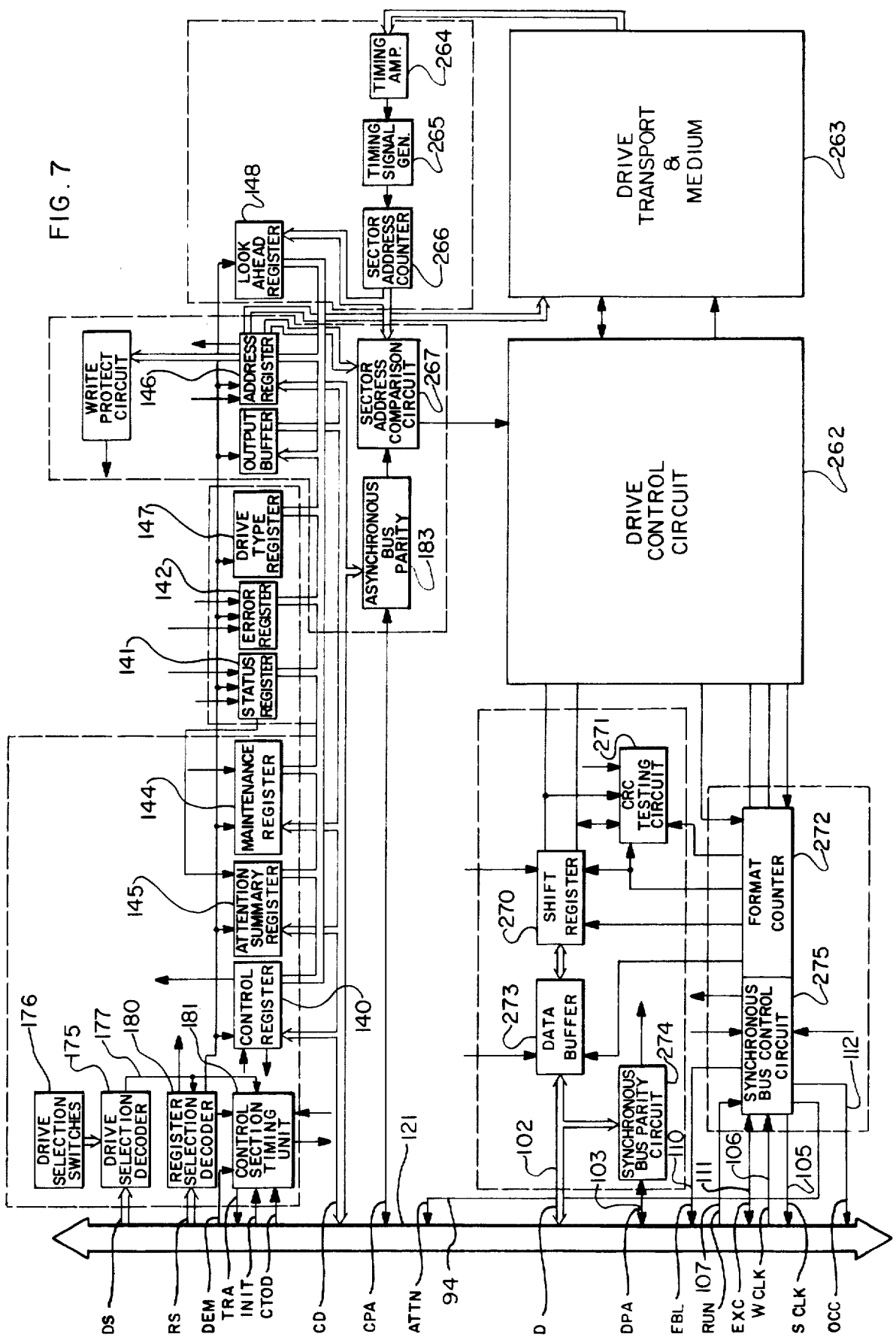
FIG. 7 is a block diagram of a device constructed in accordance with this invention.

A typical drive control path is shown in FIGS. 6 and 7. The controller shown in FIG. 6 contains several registers, which are called local registers. They include:

1. Control and status registers 133 and 134 for receiving commands and for receiving and storing operational status information for the controller;

2. The output buffer 124; this register has a connection 124 (FIG. 5) to the drive control path and its contents may be retrieved under system control for diagnostic and other purposes;

3. A word counter register 136 for storing the number of words to be transferred; it counts each data word as it is transferred and disables the drive upon the completion of the transfer;

4. A bus address register 137 for storing the address of a location connected to one of the system buses 120 or 400, which is either sending or receiving the data.

FIG. 7 depicts a fixed-head disk memory unit as a typical drive for purposes of explanation. Such a drive contains the following registers, which are called remote registers:

1. A control register 140 analogous to the control and status register 133 (FIG. 6); it stores commands and other control information; the control register 140 and the control and status register 133 can be considered as a single register in which stages are distributed among the controller and each drive connected to the controller;

2. A status register 141 for storing non-error status bits and a summary error bit; one bit position, for example, indicates whether the drive is in a ready state;

3. An error register 142 for storing error information; other drives may contain more than one such register;

4. A maintenance register 144 for storing information useful in diagnostic and maintenance operations;

5. A stage in attention summary register 145; each drive has one stage for indicating whether it has generated an ATTN signal; this register can be considered as having individual stages distributed among each of the drives.

6. A desired track and sector address register 146 for storing the number of the drive track and sector at which a transfer is to start;

7. A drive type register 147 for storing information concerning the nature of the drive; and 8. A look-ahead register 148 for storing information concerning the actual rotational position of the disk.

Other registers which might be included in a fixed-head or other type of drive include:

1. A serial number register for displaying part or all of the device serial number; and 2. ECC position and pattern registers in drives having error-correcting codes for storing the position of an ECC pattern burst and the pattern itself.

Moving-head magnetic disk memory units normally will include:

1. An offset register for storing the amount of head offset in a moving head disk memory unit; such a register might also store information for controlling the enabling of header information or error correction circuits.

2. A desired cylinder address register for storing the cylinder address which is to be reached; and 3. A current cylinder address register for storing the actual head position over the disk in terms of a disk cylinder.

These registers are discussed more fully in connection with the operation of the drive control path.

All operations of controller and drives in a secondary storage facility constructed in accordance with this description are under the control of information stored in these registers in the controller (FIG. 6) and the drive (FIG. 7). For example, a transfer of data between the recording medium and a memory unit requires the central processing unit to transfer several items of information into the local and remote registers. The identification of the drive to be involved in the transfer is loaded into the control and status register 134 (FIG. 6), while the control and status register 133 receives information including which system bus is to be connected to the controller. The register 134, in turn, produces corresponding unit select signals. The bus address register 137 receives the initial memory address while the word counter register 136 receives a number (usually in two's complement) defining the number of data words in the block to be transferred.

Once the control and status register 134 contains the drive information, additional transfers are made to specific remote registers in that drive (FIG. 7). The track and sector address is loaded into the track and sector address register 146. If the disk were a moving-head disk, then other information might be loaded into offset and desired cylinder address registers. Still other information concerning the function to be performed would be loaded into the control register 140. As apparent, each of these transfers involves operations for loading information into drive registers from the control section 80 in the device bus 121. Thus, they can be designated "writing" operations.

It is also necessary, from time to time, to retrieve the contents of certain registers to learn the status of the drive and controller (i.e., perform a "reading" operation). For example, the status register 141 contains a DRY bit position which indicates whether the drive is busy. The look-ahead register 148 may be read to determine the actual position of the disk.

Any time there is to be a transfer into or out of a local or remote register, address signals and transfer control signals appear on the system bus 120 shown in FIG. 6 including one set of direction control signals which indicate whether the transfer involves a reading or writing operation. For example, the transfer control signals discussed in U.S. Pat. 3,710,324 include CO and C1 direction control signals. CONI and CONO signals discussed in U.S. Pat. 3,376,554 perform the same function. When the information is to move into a register, the information may appear on the system bus data lines simultaneously with or slightly after address and transfer control signals appear on the address and transfer control lines, depending upon the characteristics of the particular system.

Receivers in receiver/driver 150 in a controller (FIG. 6) comprise buffer circuits and pass the address signals and direction control signals to an address circuit 151. Each register has a unique address which the address signals designate and the address circuit 151 uses the address signals to indicate whether the address is for a register in the controller or in an associated drive. Thus, these signals implicitly indicate whether the designated register is a local or remote register and the address circuit 151 produces a corresponding LOCAL or REMOTE signal. Register selection signals (RS') from the circuit 151 pass to a register selection decoder 152 and to a device bus control circuit 160.

A. Local Transfers

When the address signals indicate that a register in the controller is to be selected (i.e., the address circuit 151 generates a LOCAL signal), the decoder 152 subsequently produces a signal which selects both the local register and the direction of the transfer. Each "conductor" from the decoder 152 is really two wires; one wire corresponds to a writing operation; the other, a reading operation. Thus, the decoder produces a "WCin" selection signal when a word count is to be stored in the word counter register 136. To read the contents of the word counter register 136, the decoder would produce a "WCout" selection signal.

Other transfer control signals from the bus 120, usually delayed for some period following the appearance of the address signals, enable the decoder 152 to produce an appropriate selection signal and enable an address timing circuit 155. These transfer signals may be either DATI, DATO, CONI or CONO signals in the system of FIG. 2 or MSYN and SSYN signals in the system of FIG. 3. The address timing circuit 155 produces a delayed DEV SEL signal in response to a first synchronizing signal if the address circuit has validated the incoming address and produced a VALID signal. The DEV SEL signal energizes a timing circuit 156. The timing circuit 156 transmits a REG STR pulse after the appearance of a signal from the decoder 152 and, in a writing operation, loads information on control data wires 154 into the selected local register. The timing circuit 156 may also couple the DEV SEL signal to the device bus control circuit 160 to produce another transfer control signal on the system bus 120 to indicate that the transfer is complete (when such a signal is necessary for a system operation).

To read the contents of the word counter register 136, for example, the address and transfer control signals cause the decoder 152 to transmit the WCout selection. This signal is one input to a multiplexer 162 which selectively couples the output of either the word counter register 136 or the bus address register 137 onto an intermediate bus designated BUSI. Specifically, the multiplexer 162 includes an AND gate 163 which receives the output from the bus address register 137 and an BAout signal from the decoder 152; and an AND gate 164 which receives the output of the word counter register 136 and the WCout signal from the decoder 152. An OR gate 165 couples the selected one of the AND gates 163 and 164 onto the BUSI bus and then, through drivers 166, onto the system bus 120.

The multiplexer 162 is shown diagramatically only. In an actual circuit there would be an AND gate associated with each bit position in each of the registers 137 and 136. The BAout and WCout signals would then enable all the AND gates associated with the respective registers.

The drive control path shown in FIG. 6 also contains multiplexers 170 and 172. Multiplexer 170 selectively couples signals onto the BUSI bus either from the output buffer 124 or from the drive coupled from the device bus through receivers 171 in response to OBout or CDout signals from the decoder 152. CS1out and CS2out signals from the decoder 152 control the multiplexer 172 so it selects the couples the output of either the register 133 or the register 134 onto the BUSI bus.

While reading control information from a local register, the device bus control circuit 160 may, if the system requires it, issue another synchronizing control signal which indicates the transfer is complete. Once the REG STR signal terminates and the optional synchronizing control signal appears, the controller and system have completed the transfer (i.e., the selected local register has been read).

The steps for loading information into a local register are similar. The direction control signals from the address circuit 151 indicate a writing operation. Thus, an input conductor for a selected register, rather than a multiplexer, is energized by the decoder 152. When new information is to be stored in the word couter register 136, the decoder 152 produces the WCin signal. The information to be stored appears on the bus 154 which is equivalent to the control data wires 84 in FIG. 4. The coincidence of the REG STR and WCin signals loads the word counter, register 136.

Normally the selection signal from the decoder 152 and the REG STR signal from the timing circuit 156 are applied directly to input gating circuits in their respective registers. FIG. 6, however, shows a gating circuit 173 whose output is applied to both the register 136 and a drive word counter register 174. The register 174 stores the number of words transferred between the controller and drive. As shown in FIG. 6, this register is not connected to the BUSI bus, so its contents cannot be read.

Thus, transfers of control information to or from local registers use the same sequence as the transfer of similar information to or from analogous registers in other units connected to an input-output bus or a common bus in the two disclosed systems. When the transfer involves a remote register, the controller must route the control information to involve the appropriate remote register. The control information still passes through the controller, but the controller must additionally control each transfer with the designated register.

B. Remote Transfers

When an address on the system bus 120 designates a register in a drive, the address circuit 151 produces a REMOTE signal which is applied to the device bus control 160. In response to this signal the device bus control 160 is enabled to pass the RS' signals from the address circuit 151 to the output drivers 161. The UNIT SELECT signals from the control and status register 134 and the direction control signals are also inputs to the drivers 161.

The appearance of a valid address, with its concomitant VALID signal, and the transfer synchronizing signal from the system bus 120 produces the DEV SEL and the REG STR signals as previously discussed. The DEV SEL enables the output to the device bus drivers 161 to couple the RS', UNIT SELECT, and direction control signals onto wires in the control set 83 of the device bus 121 as RS, DS and CTOD signals respectively. In addition, the REG STR signal causes the control 160 to produce a DEMAND signal which passes through the enabled output drivers 161 as the DEM signal.

Now referring to FIG. 7, a drive selection decoder 175 in each drive compares the incoming DS signals with signals from drive selection switches 176 to determine whether the DS signals idensity that particular drive. If they do, the decoder 175 produces an enabling signal on a conductor 177 to activate a register selection decoder 180 and a control section timing unit 181. The register selection decoder 180 receives the RS signals and in response produces signals which are coupled to the selected register in the drive, e.g., registers 140, 141, 142, 144, 145, 146, 147 or 148. These selection signals enable subsequent timing signals from the timing unit 181 to effect a transfer. The timing unit 181 also receives the DEM and CTOD signals from the bus 121 and transfers a TRA signal onto the bus indicating that the drive has moved control information onto the data set 81 or that the data on the data set 81 has been stored.

Referring again to FIG. 6, the device bus control 160 receives the TRA signal and then either enables data to pass through the receivers 171 in response to the CDout signal from the register selection decoder 152 or enables the drivers 182 if the decoder has produced the CDin signal. In addition, the control 160 can produce the previously discussed optional synchronizing signal for controlling the transfer between the system and the controller. Thus, the decoder 152 produces a CDin or CDout signal during each remote register transfer.

A more thorough understanding of these remote register transfers will be obtained from a discussion of reading and writing operations in some detail in terms of the signals transfers between the controller in FIG. 6 and the registers in FIG. 7.

1. Reading Operation

Figure 8:
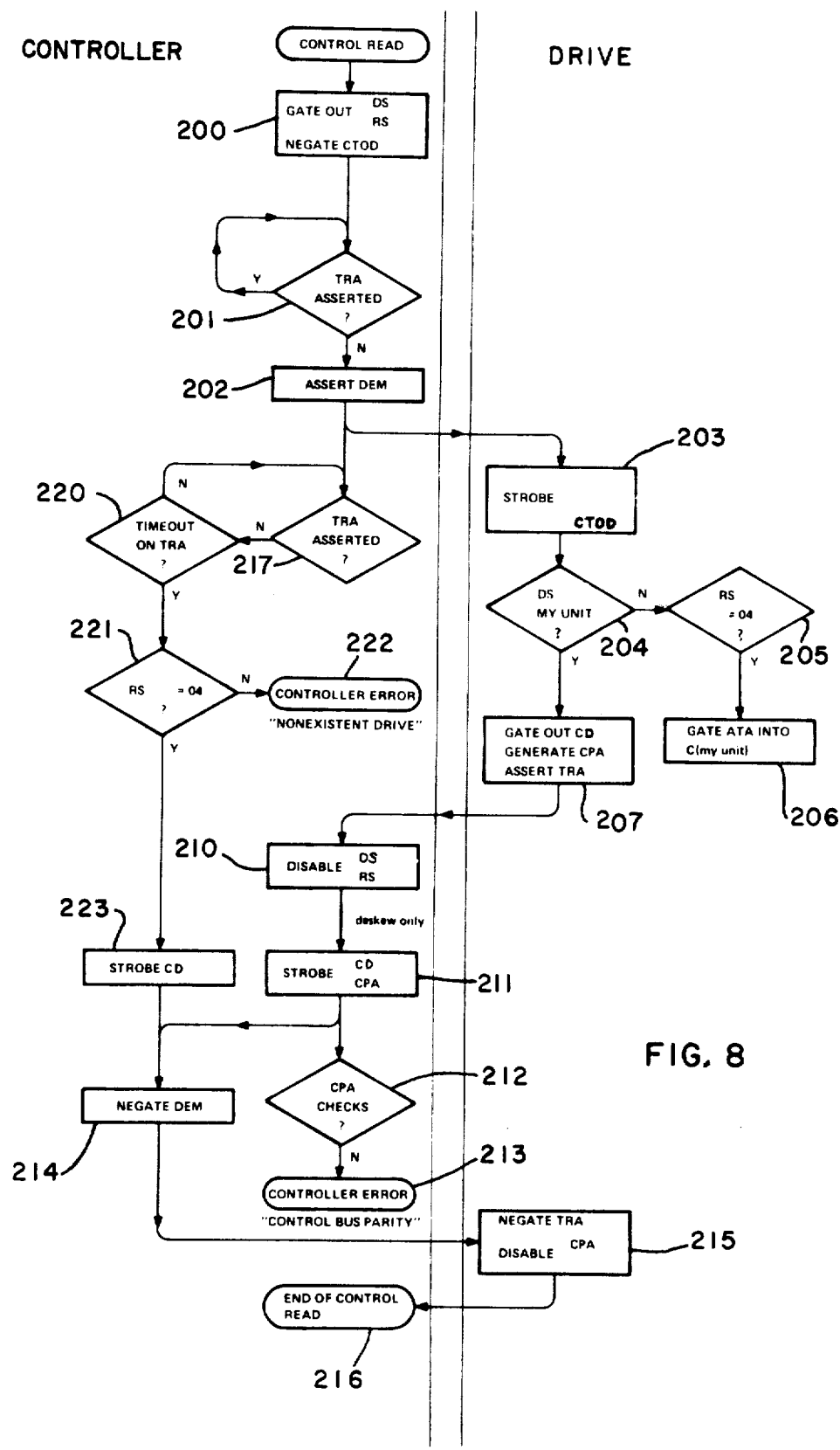
FIG. 8 is a flow chart of the operation for retrieving information in a register shown in FIG. 7.
Figure 9:
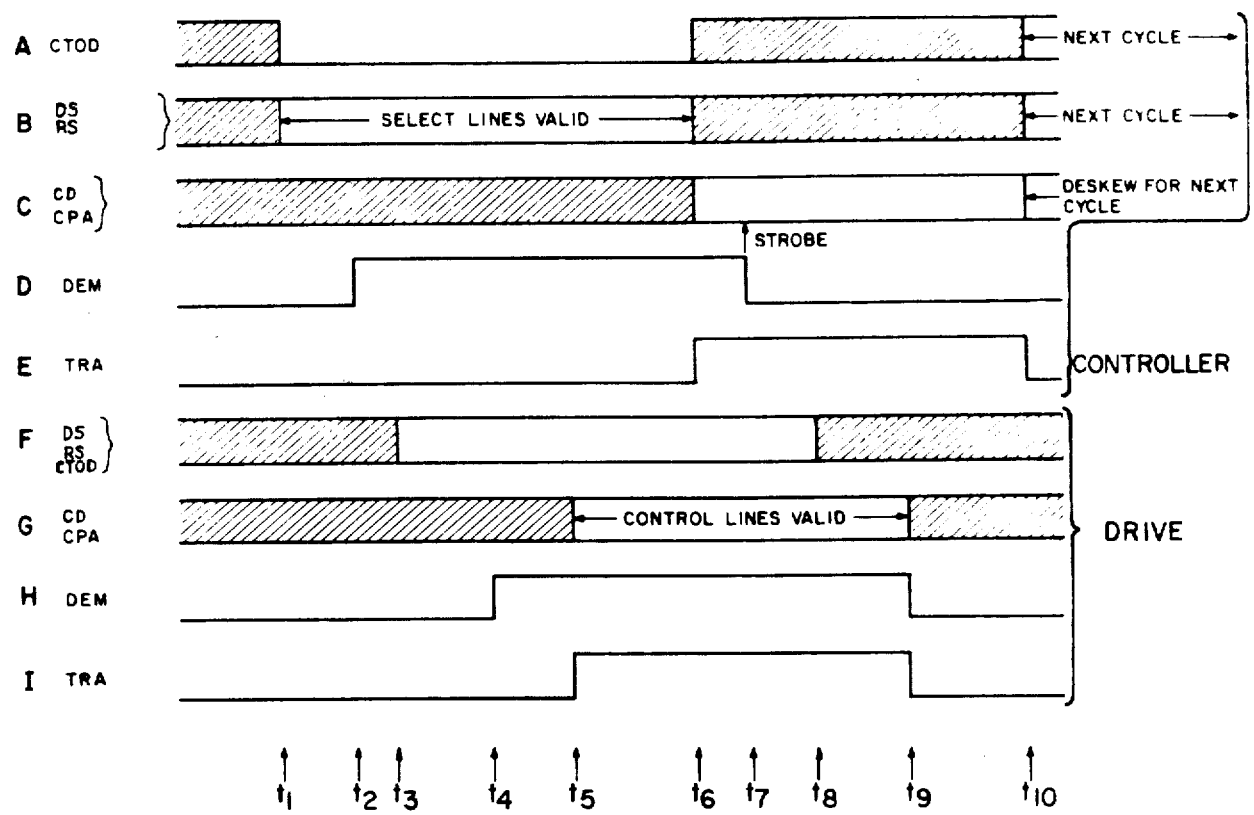
FIG. 9 includes timing charts corresponding to FIG. 8.

FIG. 8 is a flow chart of the steps necessary to read control information in a remote register while FIG. 9 illustrates the timing of such signals. Step 200 and Charts 9A and 9B represent the process of placing the appropriate values of the DS, RS and CTOD signals onto the device bus 121 from the output drivers 161 shown in FIG. 6 at time $t1$. If a TRA signal from a previous transfer with any drive connected to the controller is asserted, the controller waits for it to terminate as represented by step 201. At the completion of this interval, step 202 and Chart 9D indicate that the device bus control 160 and the output drivers 161 couple the DEM signal onto the device bus at time $t2$.

Now referring to FIGS. 6, 7, 8 and 9, the signals on DS, RS and CTOD wires from the controller arrive at the drive at time $t3$ (Chart 9F), the interval from $t1$ to $t3$ representing a bus signal propagation delay. After a similar delay from time $t2$, the DEM signal is received at the drive at time $t4$ (Chart 9H) causing the control section timing unit 181 to load (or strobe) the CTOD signal as represented by step 203. The drive selection decoder 175 will have already determined whether the drive is the selected drive. If the DS signals do not designate the drive (step 204), the drive in step 205 determines whether the RS bits designate the attention summary register. If a register other than the attention summary system is designated, but the DS bits do not select a drive, no further steps occur in that drive. If the attention summary register is addressed, then the ATA signal is sent (step 206) as described later.

Assuming that the DS signals identify the drive in FIG. 7, the control section timing unit 181 at time t5 loads the information from the selected register onto the control data lines in the bus 121 as disclosed in step 207A and Chart 9G. At the same time a control bus parity circuit 183 generates a parity bit which is loaded onto the CPA wire 85 and the unit 181 transmits the TRA signal at time t5 as shown in Chart 9I.

When the controller receives the control information and the TRA signal as shown in Charts 9C and 9E at t6, the device bus control 160 may immediately disable the DS, RS and CTOD signals (Charts 9A and 9B and step 210). After a short delay, the device bus control 160 opens the receivers 171 at time $t7$ to load the control information and parity signal from the device bus 121 through the multiplexer 170 and drives 166 onto the system bus 120 (step 211). When the system receives the control information, the control 160 terminates the DEM signal (Chart 9D and step 214) so that the drive senses the transition of the DEM signal (Chart 9H) and terminates the TRA signal (Chart 9I and step 215) and the control data and parity signal. Once the controller senses the termination of the TRA signal at time $t10$ (Chart 9E), the transfer is complete (step 216).

As apparent, the control information at the receivers 171 in FIG. 6 is valid from time $t6$ to time $t10$ (Chart 9C). The TRA signal can therefore be used to synchronize operations on the system bus 120 and the device bus 121.

Referring to FIG. 8, once the controller transmits the DEM signal in step 202, it begins timing a response interval. This is represented by steps 217 and 220. If the drive transmits the TRA signal before the predetermined time interval expires, the interval timing operation terminates in step 217. If not, the controller, at the end of this interval, determines whether the attention summary register 145 is being read (step 221). If it is not, then no device has responded and a non-existent drive has been designated. Thus, step 221 branches to step 222, and the controller sets an NED bit position described later in the control and status register 134 (FIG. 6). If the attention summary register 145 has been addressed, step 221 branches to step 223, and all the information on the data set 81 is sensed before terminating the DEM signal at step 214.

If a parity error is discovered in step 212 during a transfer of information from a drive (step 211), step 213 causes an MCPE bit position in the status and control register 133 to be set.

2. Writing Operation

Figure 11:
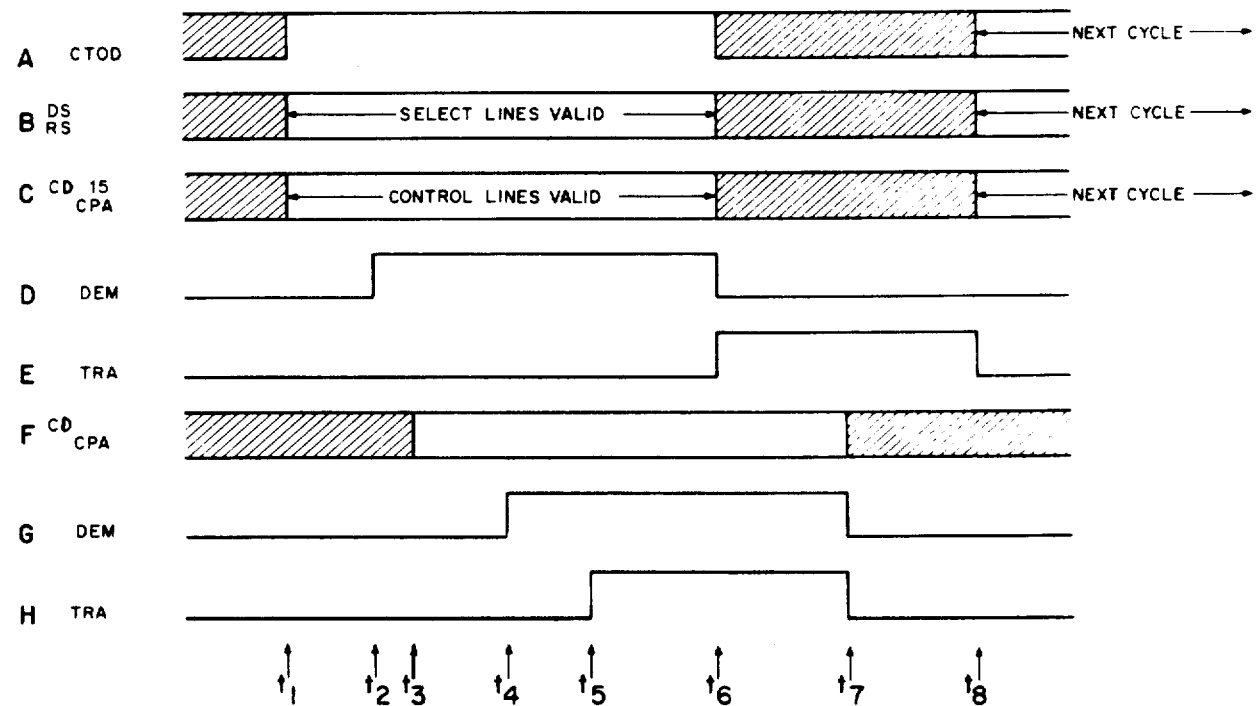
FIG. 11 includes timing charts corresponding to FIG. 10.

FIG. 10 is a flow chart for writing control information into a remote register while FIG. 11 is a corresponding timing diagram. When the controller receives a command to write control information (step 225) it transfers DS, RS and CTOD signals onto the control information lines and a parity signal onto appropriate wires in the control section 80. This occurs at step 226, which corresponds to time $t1$ as shown in Charts 11A, B and C. The control information passes through the drivers 182, shown in FIG. 6, under the control of a gating signal from the device bus control 160, which responds to the DEV SEL signal as previously discussed. The control signals pass through the output drivers 161.

If a TRA signal from a previous transfer with any drive connected to the controller is still asserted, the controller waits for it to terminate as shown in step 227 and discussed with respect to the reading operation. Then at time t2 the controller, in step 228, transmits the DEM signal onto the device bus 121 as shown in Chart 11D. Steps 230, 231, 232 and 233 are analagous to steps 203, 204, 205 and 206 in FIG. 8. The control information on the data set 81 arrives at the drive at time $t3$ (Chart 11F) and the DEM signal arrives at time $t4$ (Chart 11G). In response to these signals, the control section timing unit 181 in the drive (FIG. 7), in step 234 and at $t5$ in Chart 11H, loads the control information into the designated register and the CPA signal into the parity circuit 183. In steps 240 and 241, the circuit 183 provides a parity error signal if an error exists to set a PAR bit position in the error register 142.

At $t5$ the drive also transmits the TRA signal (Chart 11H), which arrives back at the controller at t6 (Chart 11E). In response, the device bus control 160 turns off the drivers 182 and the output drivers 161 thereby effectively disconnecting the controller and drive by terminating all signals from the controller on the device bus at t6 as shown in Charts 11A, B and C and including the DEM signal (Chart 11D). At $t7$, Chart 11F shows that the control information and parity signal from the controller on the data set 81 terminate at the drive as does the DEM signal. Thus, at $t7$ the drive terminates the TRA signal (Chart 11H) and the controller senses this termination at $t8$ (Chart 11E). This completes the writing operation and permits initiation of another cycle.

Now referring to FIG. 10, after the controller asserts the DEM signal in step 228, it starts timing a response interval like that in a reading operation. Steps 244, 245, 246 and 247 are analogous to steps 217, 220, 221 and 222 in FIG. 8. If the attention summary register 145 is being loaded, then the information remains on the control data wires until the end of the time-out period as described later. The controller then completes the writing operation by removing the control information in step 242 to complete the operation with step 243.

C. Local and Remote Registers

Local registers in the controller and remote registers in the drives store control and status information. Some registers, such as the work counter register 136, contain one item of information, such as the word count, so all bit positions or stages are interrelated. Other registers store diverse information in one or more groups of registers. For example, the control and status register 133 has a stage for indicating special conditions and another stage for indicating that a transfer related error has occurred. Registers in which all stages are interrelated may be arranged so either data can only be retrieved from them by the system (i.e., read-only register) or data can be retrieved or altered in them by the system (i.e., read/write register). Registers in the former category are denoted by a cross to the right of the designation in FIGS. 12 and 13. In registers which contain independent stages, each stage may be arranged so its data either may only be retrieved (i.e., a read only stage) or may be retrieved or altered (i.e., a read/write stage). A cross above a stage indicates that it is a read-only stage.

The particular assignment of bit positions or stages made in the following discussion of local and remote registers is for purposes of explanation only. Other assignments may be made. Further, certain of the defined stages and the information they represent may be omitted and other stages representing other information may be substituted or added.

1. Control and Status Register 133

Figure 12:
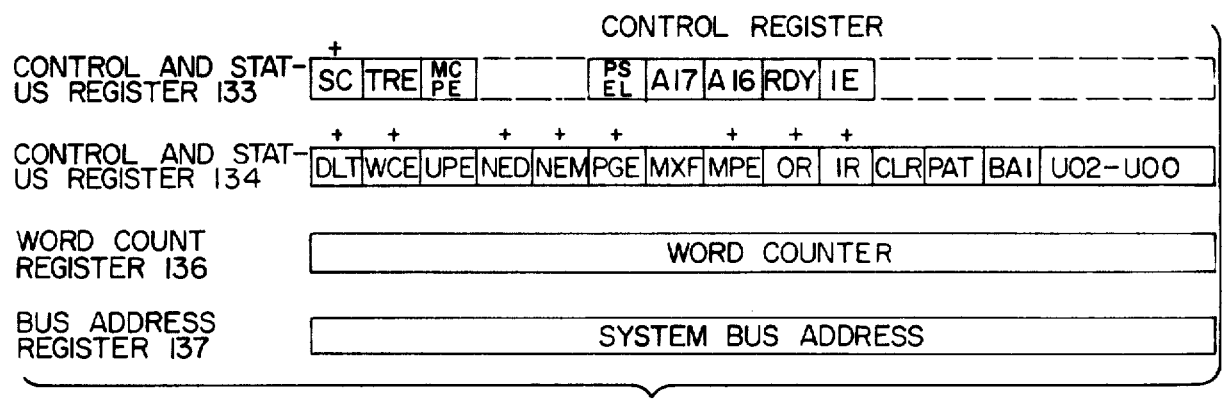
FIG. 12 depicts the organization of registers adapted for use in a controller.

The control and status register 133 is a multi-stage or multiple bit position register. Some stages are located in the controller; others are located in each drive in what is designated the control and status register 140. The controller stages are shown in FIG. 12. One such stage is an SC stage which is set to indicate that (1) a transfer related error has occurred (i.e., a TRE bit position is set), (2) that an MCPE bit position has been set because a parity error was detected during a remote register reading operation as previously discussed, or (3) that some drive connected to the controller has produced an ATTN signal on the wire 94 in the control set 83 (FIG. 4). The controller resets the SC bit position in response to a system resetting (INIT) signal on the system bus 120 in FIG. 6, to a controller clearing signal which sets a CLR bit position in a control and status register 134 or in response to the correction of the condition causing the drive to assert the ATTN signal. This stage is located in the controller itself.

The TRE stage is a read/write stage in the register 133. It is set in response to the occurrence of a transfer related error signalled by certain stages in the control and status register 134 or in response to the simultaneous assertion of EXC and EBL signals on the wires 110 and 111 in the control set 104. The previously discussed INIT and CLR signals can reset the stage. In addition, the system can clear the TRE bit position by means of a local register writing operation.

As previously indicated, the controller checks the parity signal on the wire 85 in the data set 81 (FIG. 4). If a parity error is detected, the MCPE bit position is set. The MCPE stage is a read only stage. Both INIT and CLR signals cause it to be cleared. A local register writing operation may also clear this stage.

A PSEL bit position is used to control the switching of the synchronous data path between the two system buses 120 and 400. When the PSEL stage is cleared, the selected system bus is normally the bus which connects to the control data path and data passes through receivers/drivers 295. When this stage is set, data is routed to SYSTEM BUS B 400 through receivers/drivers 402. An INIT or CLR signal or a local register writing operation will clear the stage to thereby restore the connection between the system bus which connects to the control data path, usually SYSTEM BUS A 120.

The control and status register 133 shown in FIG. 12 also contains A17 and A16 bit positions which are read/write stages. These positions can augment the contents of the bus address register 137 if the address is not sufficient uniquely to identify a location. Either the INIT or CLR signal or a local register writing operation can clear these two bit positions.

An RDY bit position indicates the condition of the synchronous data path in the controller and comprises a read/write register stage. It sets when power is applied and at the completion of each transfer operation over the synchronous data path. Whenever a data transfer function is received in the register 133 with the GO bit set, the RDY stage is reset.

An IE bit position is set by a local register writing operation to cause the controller to interrupt the system connected to the system bus 120 in response to the assertion of a RDY or ATTN signal. It enables other controller circuits to respond to various error conditions or to the completion of an operation to produce an interrupting signal. This bit position is reset when the system interruption circuitry recognizes the interruption or in response to an INIT or CLR signal. If a local register writing operation resets this stage, the controller can not interrupt the system and any pending interruptions are cancelled.

Several FUNCTION signals designate a specific operation the drive is to perform. They are received by the controller, although the corresponding register stages are located in the control and status register 140 in each drive. These signals define various functions which may involve a data transfer. The register stages are cleared by an INIT or CLR signal. A DRIVE CLEAR operation defined by the FUNCTION bits causes the stages to be cleared. Typical FUNCTION signals also produce the previously discussed READ, WRITE and WRITE-CHECK operations or a SEARCH operation to locate a particular area in the drive without a data transfer taking place.

When a GO bit position is set, the drive performs the operation identified by the FUNCTION bits. The INIT signal will clear the GO bit and abort any operation in response to a command. The GO bit is also cleared when an operation over the synchronous data path is completed. Setting the GO bit also can reset various error condition bit positions as discussed below.

2. Control and Status Register 134

All stages in the control and status register 134 are located in the controller. Individual register stages reflect the operation and status of the controller, especially error conditions which might exist. A DLT bit position is one example of such a stage which is set when the controller is not able to supply or accept in a timely fashion a data word over the synchronous data path during a writing or reading operation, respectively. In a two-port operation when the PSEL stage in the system 133 is set, an INIT signal at the second system bus also sets the DLT stage if a transfer is then occuring over that second bus. Any time the DLT stage sets, the TRE stage in the register 133 is set.

A WCE bit position is set during a WRITE CHECK operation when the recorded data from the drive does not match the corresponding word in a memory location in the system. This stage sets the TRE stage in the register 133.

A UPE bit position is set during a data transfer in response to a WRITE or WRITE-CHECK command over the synchronous data path when a parity error is detected on one of the system buses 120 or 400. The TRE stage also sets in response to such a parity error.

An NED bit position indicates a non-existent drive and is set by the controller as described with reference to FIGS. 8 and 10. This also causes the TRE stage to be set.

If a system location specified by the controller does not exist, the controller senses an incompleted transfer operation and thereby sets an NEM bit position and the TRE stage.

When the system sends a READ, WRITE or WRITE-CHECK command while the controller is already involved in another transfer, the controller sets a PGE bit position in the register 134. This causes the TRE stage to set.

Any time a drive does not respond to a data transfer command within a predetermined time, the controller sets MXF and the TRE bit positions.

An MPE and the TRE bit positions set if the controller detects a parity error during a transfer over the device bus in response to a READ or WRITE-CHECK COMMAND.

All the foregoing stages in the register 134 can be cleared by any one of four procedures. First, a system resetting signal clears the stages. Secondly, the system can issue a clearing command to set the CLR bit position as discussed later. Thirdly, the system can load the register 133 with the combination of FUNCTION bits which designate a data transfer operation and set the GO bit position. Finally, a word can be loaded into the register 133 which clears the TRE bit position. In addition, the UPE and MXF bit positions can be cleared directly by a local register writing operation.

OR and IR bit positions in the register 134 are used in diagnostic operations and are set when the output buffer register 124 is full or the input buffer register 122, respectively, in the synchronous data path is empty.

A system resetting signal, a local register writing operation to set the CLR bit, or an operation for reading the information in the respective buffers clears the OR stage or sets the IR stage.

Sometimes it is desirable to use either even or odd parity coding during a transmission over the data paths. A PAT bit position in the status register 134 can be set to produce even parity coding and decoding and reset to produce odd parity operations. A local register writing operation alters the state of the stage.

Normally the bus address register 137 is incremented or altered during each transfer to identify system locations in succession. A BAI stage in the register 134 can be set during a local register writing operation to inhibit the incrementing steps, provided the controller is not then involved in a data transfer. This condition is indicated when the RDY stage is set. Either a system resetting signal or CLR signal can clear the BAI stage.

The UO2 through UO0 bit positions receive their information during a local system writing operation. These stages are cleared in response to a system resetting signal or to a CLR signal. Once a transfer starts, they can be altered without interfering with the transfer.

3. Word Counter Register 136

The word counter register 136 initially stores the initial word count, i.e., the number of words to be involved in a data transfer. The number stored is usually the two's complement of the actual word count and the register, which is a counter, is incremented during each transfer of a word over the synchronous data path between the controller and the system. When the register 136 reaches ZERO (i.e., the register overflows or issues a CARRY), the requested transfer is finished. This register can only be cleared by transferring a ZERO value to it through a local register writing operation.

4. Bus Address Register 137

Locations in the system from which data is retrieved or to which data is sent over the synchronous data path are identified by the bus address register 137. The A16 and A17 bit positions in the register 133 augment this information as noted above. The register 137 is a counter which is incremented in response to each data word transfer in order to identify the successive locations corresponding to the successive words involved in a transfer operation. Either a system resetting or CLR signal clears the register 137.

5. Data Register

A data register (not shown) can be addressed, primarily for diagnostic purposes. There may be no physical register. Specifically, if the data register is addressed during a local register writing operation and the IR signal indicates that the storage facility 123 is not full, the information on the system bus 120 is loaded into the input buffer 122 (FIG. 6). This condition is represented by an OBin signal. On the other hand, an OBout signal is produced when the data register is addressed during a local register reading operation and OR signal indicates that data is present. The OBout signal causes the information in the output buffer 124 to be loaded onto the system bus 120.

6. Status and Control Register 140

Figure 13:
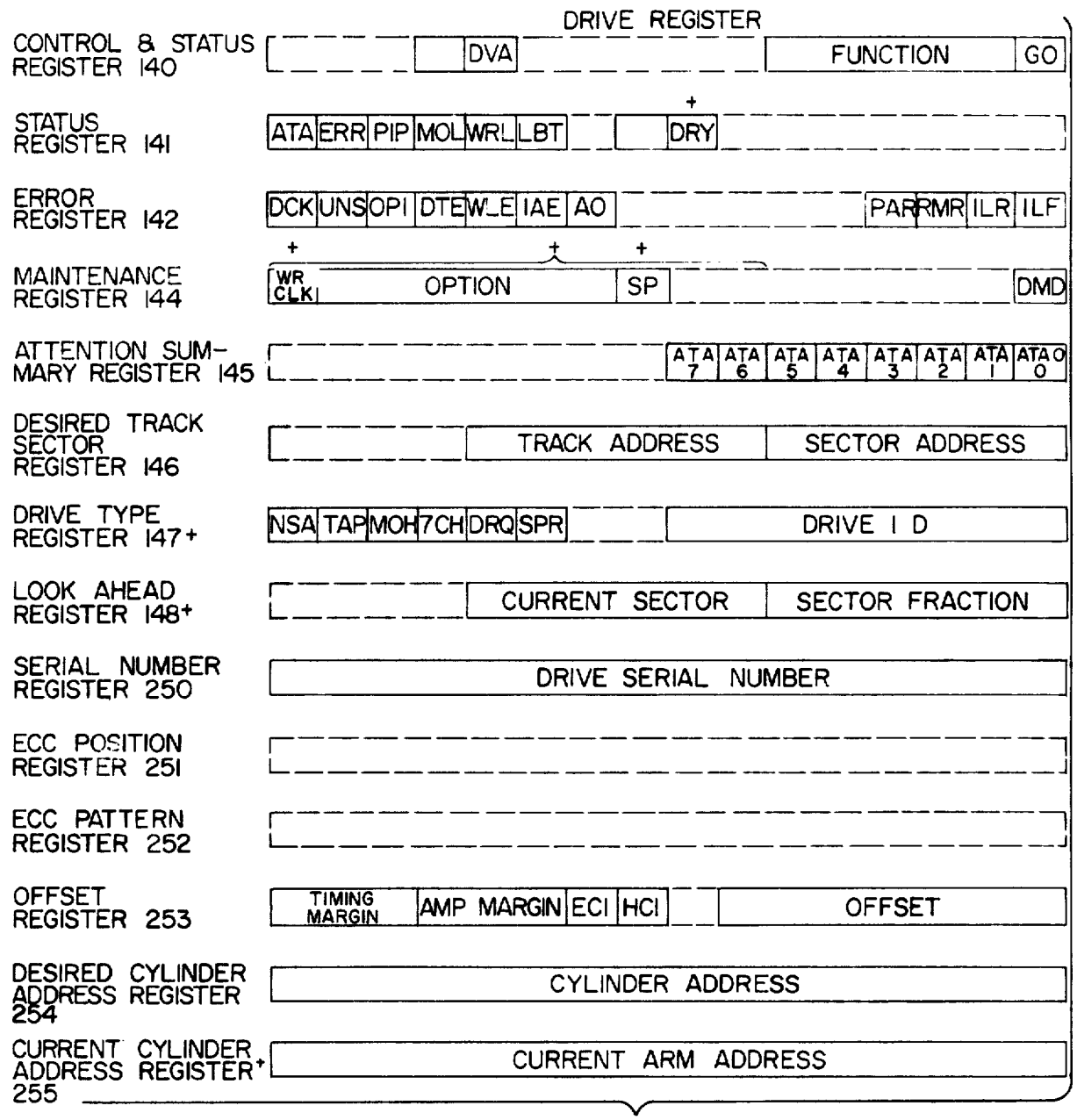
FIG. 13 depicts the organization of registers adapted for use in a drive.

Now referring to FIG. 13, which contains in diagrammatic form, the organization of typical registers in a drive, the control register 140 stores the FUNCTION and GO bits previously described with respect to the control and status register 133. Whenever the register 133 is loaded, the controller produces a remote writing operation to load FUNCTION and GO bits into corresponding stages in the designated A DVA stage is set whenever the drive is available for operation and is a read-only position.

7. Status Register 141

The status register 141 contains the status of the drive. The contents of any bit position in the register 141 are dependent only upon monitoring circuits within the drive. This register cannot be loaded from the controller.

Within the register 141, an ATA bit position and an ERR bit position are related. The ERR bit position is set whenever any other stage in the error register 142 ets. This, in turn, sets the ATA bit position in the drive, which is also set whenever operations in response to a SEARCH command are complete. A system resetting or a CLR signal will clear the ATA and ERR stages. It is also possible to clear the ATA stage by clearing the corresponding location in the attention summary register 145 as described later or by using a local writing operation to transfer a new command to the drive which sets the GO bit position. The last two methods do not clear the error indicators themselves.

Whenever an operation in response to a SEARCH command is in progress, a PIP stage is set. Seeking operations, as apparent, are applicable only to a moving-head disk memory or equivalent units. Once the operation is completed, this stage is cleared.

Still referring to the register 141, MOL and DRY stages are set when the drive is in an operating condition; that is, the MOL stage is set when the drive power is on and, in the case of a continuous moving medium such as a disk or drum, the medium is up to speed. The DRY stage is set to indicate that the drive can accept a command while the drive is not responding to a prior command; the DRY bit position is cleared in response to a data transfer command with the GO bit position set. Any change of state of the MOL stage also causes the ATA stage in the drive to be set.

A WRL stage is set whenever an address in the desired track/sector register 146 identifies a track which is protected against writing operations. Otherwise, this stage is cleared.

An LBT bit position is set during a transfer over the data set 101 (FIG. 4) to or from the highest sector (i.e., the "last" sector) on a drive. This stage can be cleared by a system resetting a CLR signal, by transferring a new address into the register 146 or by clearing the drive.

8. Error Register 142

Now referring to the error register 142, a DCK bit position is set whenever circuitry in the drive detects an error during a reading operation over the data set 101 in response to a READ or WRITE-CHECK command.

If the power supply voltage for the drive falls below a safe level, a UNS stage sets; it is reset only when the supply voltage is above the minimum safe level.

During a data transfer operation circuits in the drive monitor index marks on the medium. If some number (e.g., three) of index marks pass after a data transfer command and the RUN signal is still absent, an OPI stage is set indicating a controller failure. In a disk unit, the passage of the number of index marks signifies more than two disk revolutions. If a SEARCH command does not terminate within two disk revolutions, a drive failure has occurred and the OPI stage is also set.

The occurrence of any timing fault, such as the loss or addition of index or clock pulses, causes a DTE stage to set.

If the WRL bit position in the register 141 is set and a writing operation is attempted, the drive sets a WLE stage.

A remote transfer which loads a non-existent address into the desired track address register 146 causes the drive to set a IAE stage.

An AO bit position is set if, when the last block of the last track of a disk is read, the word counter register 136 in the controller does not indicate that the transfer is finished.

Any time a parity error is detected, either on the synchronous data path or the asynchronous control path, a PAR stage in the error register 142 sets.

If the GO bit position in the register 140 is set and the system attempts to load the control register 140, the error register 142 or the desired address register 146, an RMR stage sets.

Whenever the register selection (RS) signals do not identify a register in a designated drive, the drive sets an ILR stage.

FUNCTION bits which define an operation that the drive cannot perform cause an ILF bit position to be set.

The error stages are set immediately upon the condition being detected. This may result, in some cases, in an immediate interruption of the system, or in an interruption at the end of the complete transfer. In either case, the drive asserts the ATTN signal at the appropriate time to initiate the interruption. With the exception of the UNS stage, the other stages can be cleared by a system resetting signal or CLR signal or in response to a remote register writing operation designating the register 143. In addition, a DRIVE CLEAR command code sent to the register 140 clears the corresponding stages in the designated drive.

9. Maintenance Register 144

The maintenance register 144 is used for various diagnostic operations to facilitate analyses of facility operation. It may contain, for example, a WRCLK bit position or stage to aid in simulating drive clocking pulse, an SP bit position to aid in simulating a sector or block pulse and other similar bit positions. Usually the maintenance register also contains a DMD bit position to place the drive in the maintenance or diagnostic mode of operation when that stage is set.

10. Desired Track/Sector Address Register 146

In the track/sector register 146 TRACK ADDRESS and SECTOR ADDRESS bit positions identify, respectively, the track and sector on a disk to be involved in a transfer. In a fixed-head unit, the TRACK ADDRESS bits identify a specific head. The register 146 can be incremented by successive sector signals so that successive sector and tracks can be involved in a transfer. When the last track and sector address allotted to any specific drive have been identified, the LBT stage in the status register 141 is set. The contents of the register 146 can be reset in response to system resetting or CLR signal or a DRIVE CLEAR command.

11. Drive Type Register 147

The drive type register 147 contains preset values to identify the nature of the drive. It might contain, for example, an NSA bit position to indicate a drive which does not use sector addressing or a TAP bit position to indicate a tape, rather than a disk, drive. An MOH bit position can indicate whether a disk is a moving head disk while a 7CH bit position indicates, on a tape unit, whether the tape has seven or nine channels. A DRQ stage could indicate that a drive connects to two controllers. Sometimes a given drive might have a slave drive and an SPR bit position could indicate the presence of such a drive. DRIVE ID bit positions might identify the drive type and major variations.

12. Look-ahead Register 148

The look-ahead register 148 is a counter which contains the sector address of the sector currently passing beneath the read/write heads in CURRENT SECTOR stages. SECTOR FRACTION stages are incremented periodically to identify the fractional portion of the sector which has passed the heads. This information can be used in reducing disk latency times to thereby improve disk transfer rates.

The remaining registers shown in FIG. 13 are not necessary for the operation of a fixed head disk unit such as shown in FIG. 6. They are, however, useful in the operation of other drives and may be incorporated in them.

13. Drive Serial Number Register 250

For example, it may be desirable to include a drive serial number register 250 in magnetic tape drives or drives with removable disks. The contents of the register will then identify the drive unit during regular operation or during maintenance operations. The contents might be recorded in binary-coded decimal notation.

14. Error Correction Code Register 251 and 252

The function of the ECC position and the ECC pattern registers 251 and 252 shown in FIG. 13 has been discussed previously. The use of these registers with error-correcting code drives is known. The position and pattern are stored directly in the respective registers. They can be read through a remote register reading operation.

15. Offset Register 253

FIG. 13 also shows an offset register 253. TIMING MARGIN and AMP MARGIN bit positions are useful in providing timing and amplitude offsets for various operations. If an ECI bit position is set and the drive has an error-correcting code function, the function is inhibited. Similarly, setting an HCI bit position inhibits header comparison circuits. OFFSET bit positions contain the actual offset value to provide a proper incremental positioning of the read/write heads over the medium.

16. Desired-cylinder and Current Cylinder Address Registers 254 and 255

Two other registers useful in moving head disk memory units are a desired-cylinder-address register 254 and a current-cylinder-address register 255. The drive moves the heads to the track identified in the desired-cylinder-address register 254 and then transfers the contents of the register 254 into the current-cylinder-address register 255. The register 255 then identifies the actual head position and is useful, for example, in determining the relative times necessary to move the heads from a current position to other positions.

17. Attention Summary Register 145

A status register 141 in each drive contains an ATA stage as previously described. The information in this stage can be transferred onto the data set 81 during a remote reading operation in which the register 141 is identified. Each ATA stage in each drive is a stage in the attention summary register 145 which has its own remote address. That is, within the register 145 there is a correspondence between the position of each stage (i.e., the wire in the control data wires 84 which receives the output of the ATA stage) and a drive, each ATA stage being coupled to a unique wire when the attention summary register is read.

Figure 14:
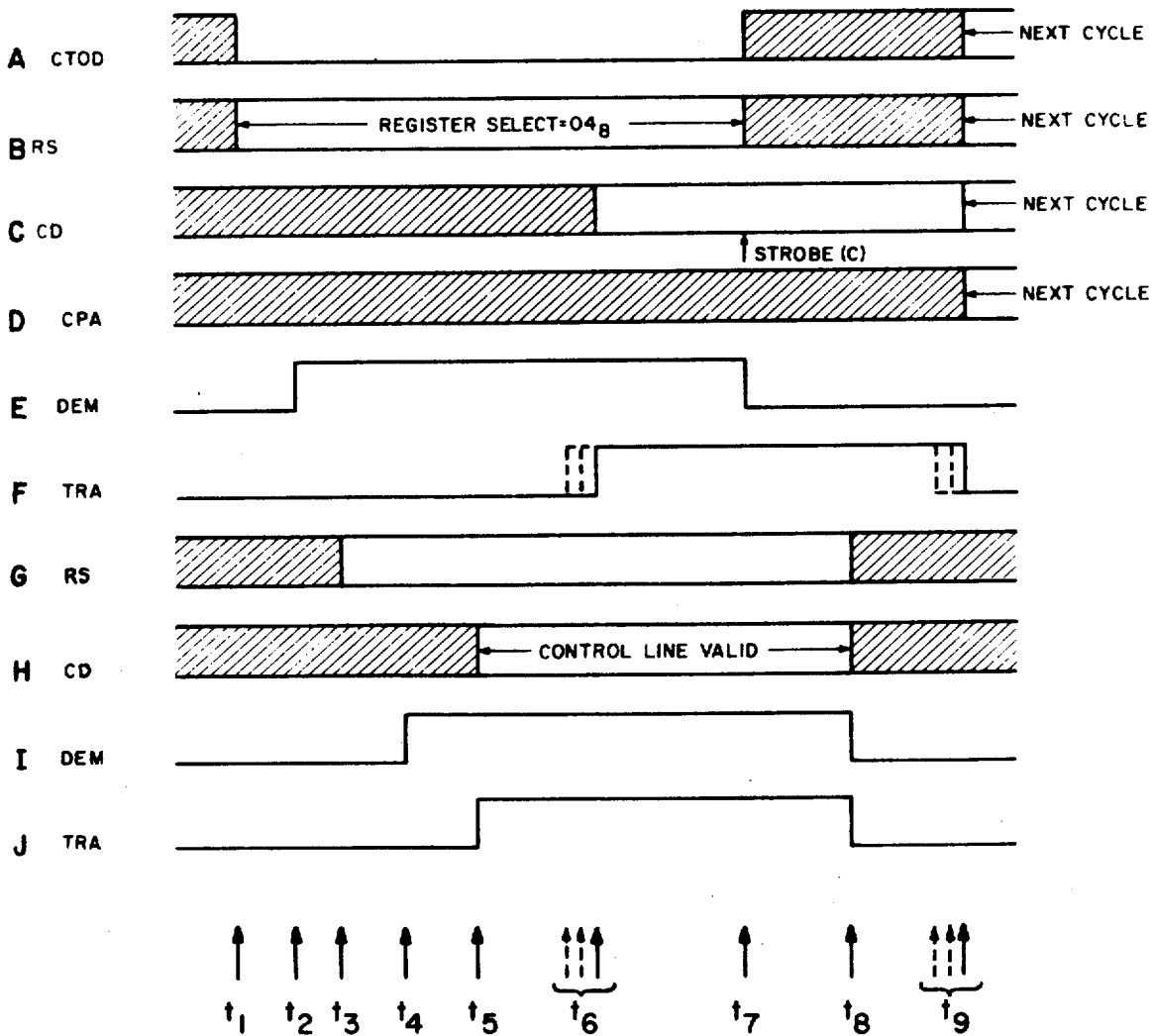
FIG. 14 includes timing charts for retrieving information from a specific register.

Whenever any stage in an error register 141 sets, its corresponding ATA stage sets. This causes the drive to issue an ATTN signal onto the common ATTN wire 94 to thereby cause system operations to be interrupted. One of the first operations in the ensuing interruption routine is the reading of the attention summary register 145. This reading operation is essentially the same as shown in FIG. 8. In this specific operation, however, the address circuit 151 produces RS' signals with a value of $04_8$, and the RS signals from the output drives 161 have the same value. The controller performs steps 200 through 202 as shown in FIG. 8 and by charts 14A, 14B and 14E at times $t1$ and $t2$ in FIG. 14. After a delay, the signals are received by all the drives on the device bus at time $t3$. Now each drive uses step 204 to branch to step 206 because the DS signals have no meaning. As the RS signals identify register $04_8$, step 205 causes step 206 to transfer the output of the ATA stage in each drive status register 141 onto a corresponding wire in the data set 81 sometime after the DEM signal arrives at $t4$. At time $t5$ in Chart 14J each drive transmits its TRA signal and the controller receives all of these in some time interval shown as time $t6$ in Chart 14F.

Several different signals may be received; however, the controller, while processing them, disables step 217 so the controller timing interval is completed by time $t7$. Then, in step 221, the controller branches to step 223 and reads the data at time $t7$ as shown in Chart 14C thereby transferring the ATA signals from all drives to the controller. This is also the time that the controller may terminate the DEM signal as shown in step 214, so that at time $t8$ the control information is removed and the drives all terminate their respective TRA signals. Then, the reading operation is completed, as previously described, by time $t9$. Thus, when the reading operation is completed, the system knows exactly which drive or drives sent ATA signals and can immediately begin reading their respective error registers or other registers without any intervening polling operations.

Figure 15:
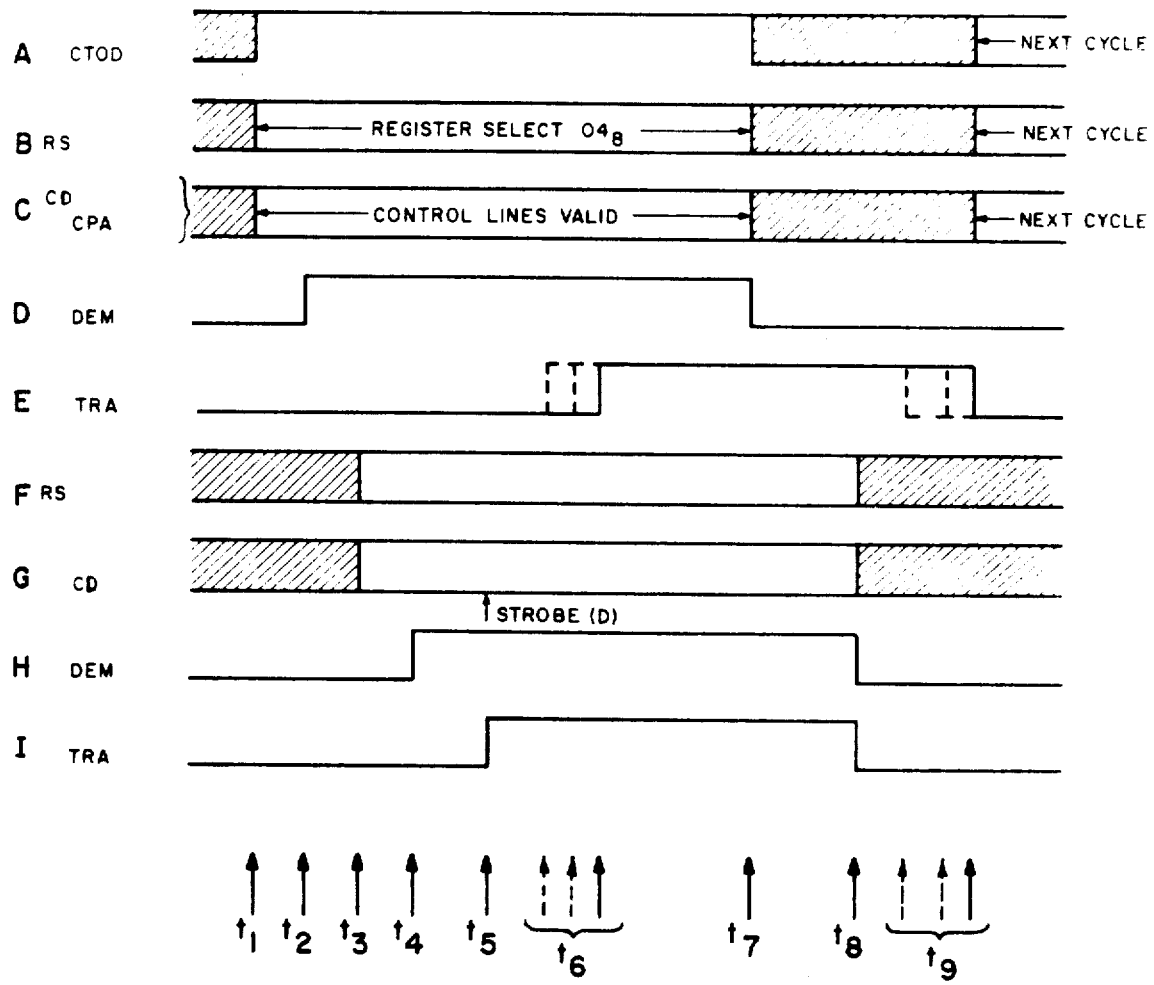
FIG. 15 includes timing charts for storing information in a specific register.

Once all the interrupting drives have been serviced, it is necessary to reset each of the respective ATA stages. This may be done with a writing operation which is similar to that shown in FIG. 10, a specific timing sequence being shown in FIG. 15. At time $t1$, step 226 loads an appropriate CTOD signal, RS signals with a value $04_8$ and the control information including a parity bit onto their respective wires in the control section 80. At time $t2$ the DEM signal is loaded onto the bus (step 228). The first control signals are received at $t3$ and the DEM signal is received at $t4$, the timing of these signals is shown in Charts 15A, 15B, 15C, 15D, 15F, 15G and 15H. Each drive may respond to the receipt of the DEM signal by transmitting a TRA signal. An ATA stage in each error register also resets at time $t5$ as shown in FIGURE Charts 15G and 15I if a corresponding signal on a control data wire 84 is asserted. Again, the controller awaits for the completion of the time interval, because in step 246, the controller senses the value of the RS signals. At time $t7$ the control signals and control data signals shown in Charts 15A, 15B, 15C and 15D are terminated by the controller and the cycle is completed as in a normal remote register writing operation.

IV. Synchronous Data Path

All the foregoing transfers to local and remote registers are in the nature of "overhead" transfers which provide the necessary control and status information to effect a transfer of data between the system connected to a system bus and a drive connected to the device bus. Certain operations in response to FUNCTION bits loaded into the control and status registers 133 and 140 (FIGS. 6 and 7) do not involve data transfers. These are summarized later. As previously discussed, there are three basic operations which do involve such data transfers and which are known as data transfer commands. They include (1) a reading operation which transfers data from the drive into the system in response to a READ command, (2) a writing operation which transfers data from the system into the drive in response to a WRITE command and (3) a write-check operation during which data stored in the drive and corresponding data in the system are compared to determine whether there were any writing errors in response to a previous WRITE command.

Figure 5:
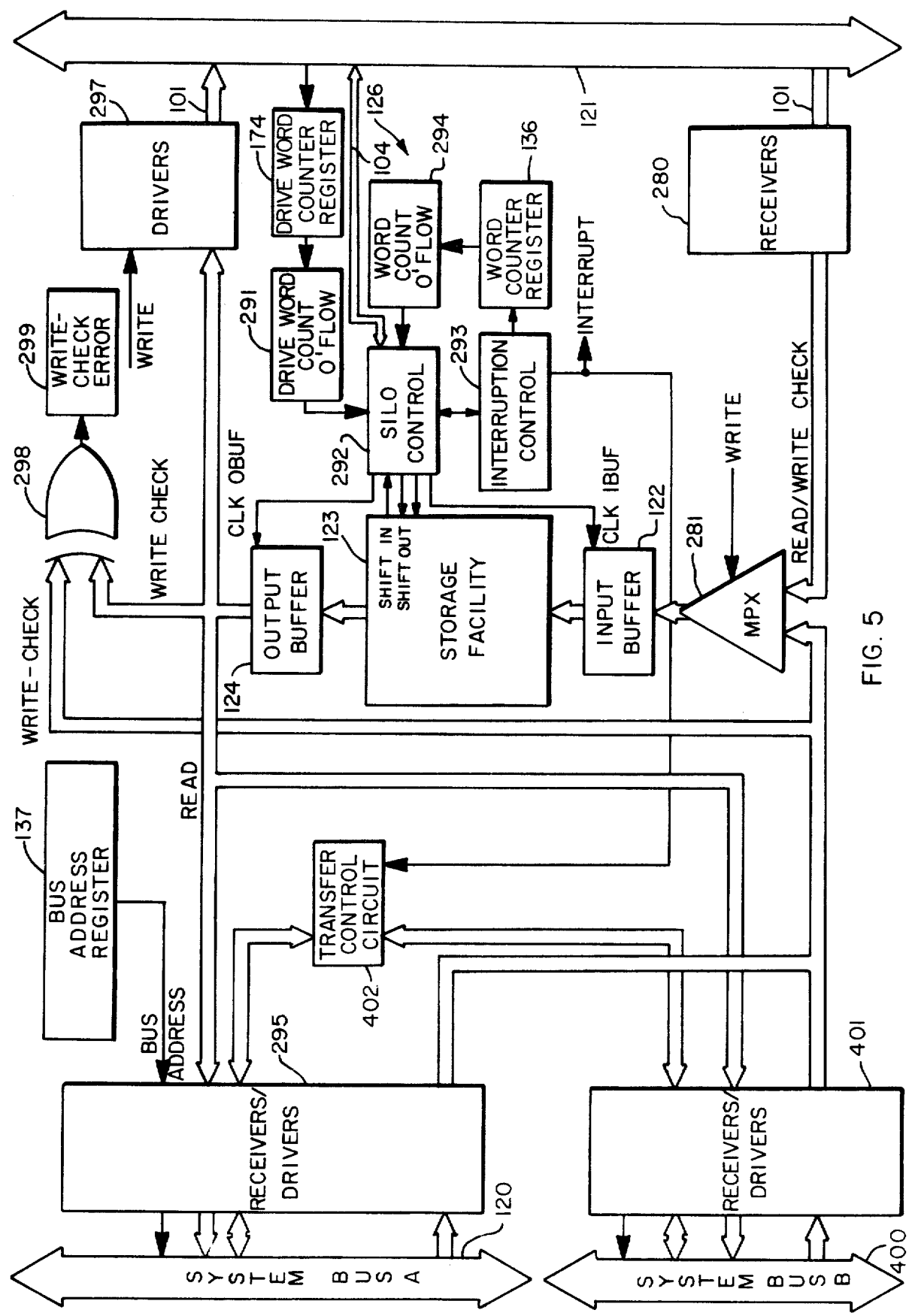
FIG. 5 is a block diagram of a synchronous data path in a controller as adapted for connection to a system as shown in FIGS. 2 or 3.

There are, as previously indicated, several preliminary drive control path transfers which precede the issuance of any of these data transfer commands. The starting system address must be loaded into the bus address register 137 in the controller (FIGS. 5 and 6). For purposes of this explanation, it is assumed that the A16 and A17 bit positions in the control and status register 133 (FIG. 12) are included in the register 137 as described above. Both the word counter register 136 and the drive word counter register 174 receive a number representing the total number of words to be transferred. The address register 146 in FIG. 7 will contain sector and track addresses and a moving-head disk will contain the desired track, or cylinder, address in the desired-cylinder-address register 254. Once this information has been received by the controller and the designated drive, the system can issue a data transfer command through a register writing operation.

A. READ Command

Now referring to FIGS. 5, 6, 7, 16 and 17, the system loads the READ command into the control and status registers 133 and 140. Thus, the FUNCTION bits now define a reading operation and the GO bit is set. This operation is represented as step 250 in FIG. 16. Step 251 represents the process of transferring the READ command into the controller and establishing various paths. In step 252 the controller issues a RUN signal on the RUN wire 107 in the control set 104 at time t2 (Chart 17B).

At time t3 the RUN signal is received at the drive (Chart 17F). By that time the drive has received the READ command (step 253) and determined the presence in the error register 142 of any preexisting errors.

If any such error does exist, step 254 branches to step 255 to clear the GO bit in the drive, set the DRY bit and ATA bit and produce the ATTN signal on the wire 94. No further action occurs in the drive. Normally, however, there are no previous uncorrected errors. Step 254, therefore, branches to step 256, whereupon the ATA bit position, if previously set, is reset and the DRY bit position is reset unconditionally to enable the drive.

All of these operations may be completed before the drive receives the RUN signal at time t3 (Chart 17F). Steps 257 and 260 are enabled by the receipt of the command to ensure that the RUN signal is received within a predetermined interval. If it is not, the drive sets the OPI bit in the error register 142 (step 261). Again, step 257 normally branches to the remaining steps in the FIG. 16 to produce the reading operation.

Looking now at FIG. 7, a drive control circuit 262 and a transport and medium 263 control perform the actual reading operation. The drive control circuit 262 responds to the desired address in the register 146 by either selecting or positioning the appropriate reading means. A timing head in the transport and medium 263 and a timing amplifier 264 sense timing marks which a timing signal generator 265 and a sector address counter 266 convert into sector numbers. The sector address from the counter 266 is coupled to the look-ahead register 148 and to a sector address comparison circuit 267. When the desired sector, identified by signals from the register 146, is reached, the comparison circuit 267 enables the drive control circuit 262 to begin retrieving data from the medium 263.

During a reading operation, the data appears serially at the input to a shift register 270 to be converted into parallel form. A CRC testing unit may also receive these data signals to produce a cyclic redundancy check word for use as known in the art. Signals from a format counter 272 provide various timing and signal modification functions for the specific transport and medium being used in the drive. From the shift register 270, the data passes into a data buffer 273 and then is clocked onto the data wires 102 on the leading edge of a SCLK pulse on the wire 105. The data parity wire 103 receives a parity bit from a synchronous bus parity circuit 274. A bus control circuit 275 receives the RUN signal on wire 107 and may send or receive the EXC signal on wire 111.

Figure 16:
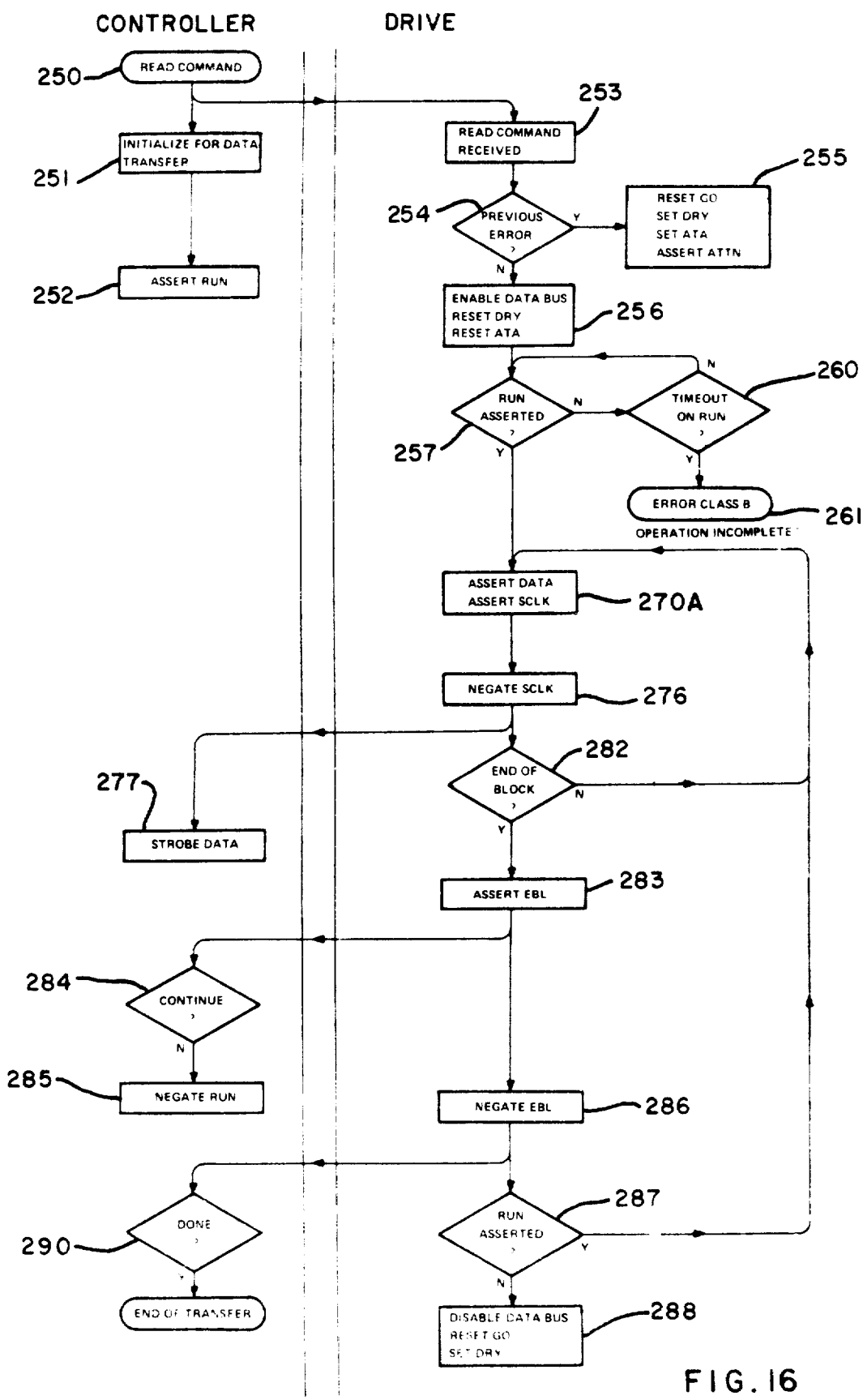
FIG. 16 is a flow chart of the operation of a controller and drive to retrieve data from the drive.

The drive begins transmitting data starting with step 270A in FIG. 16 at time t4 in Charts 17B and 17H on the leading edge of the first SCLK pulse. The first word of data and the parity bit then appear on the data and parity wires 102 and 103. At time t5 both the SCLK signal and the data arrive at the controller as shown in Charts 17A and 17D. At t6 Chart 17H shows that the SCLK pulse terminates at the drive (step 276) with the controller sensing that transition at t7 (Chart 17D). This transition causes the controller to read in the data on the data wires 102 and the data parity wire 103 during step 277 with the SCLK pulse terminating midway through the time interval that the data normally is present.

When the SCLK signal is asserted again by the drive at time t8 (Chart 17H), the next data word is transmitted onto the data wires and the cycle repeats with successive words being loaded into the controller. At the controller, the data passes through enabled receivers 280 and a multiplexer 281 which responds to the absence of a WRITE signal to couple the receivers 280 to the input buffer 122.

Figure 17:
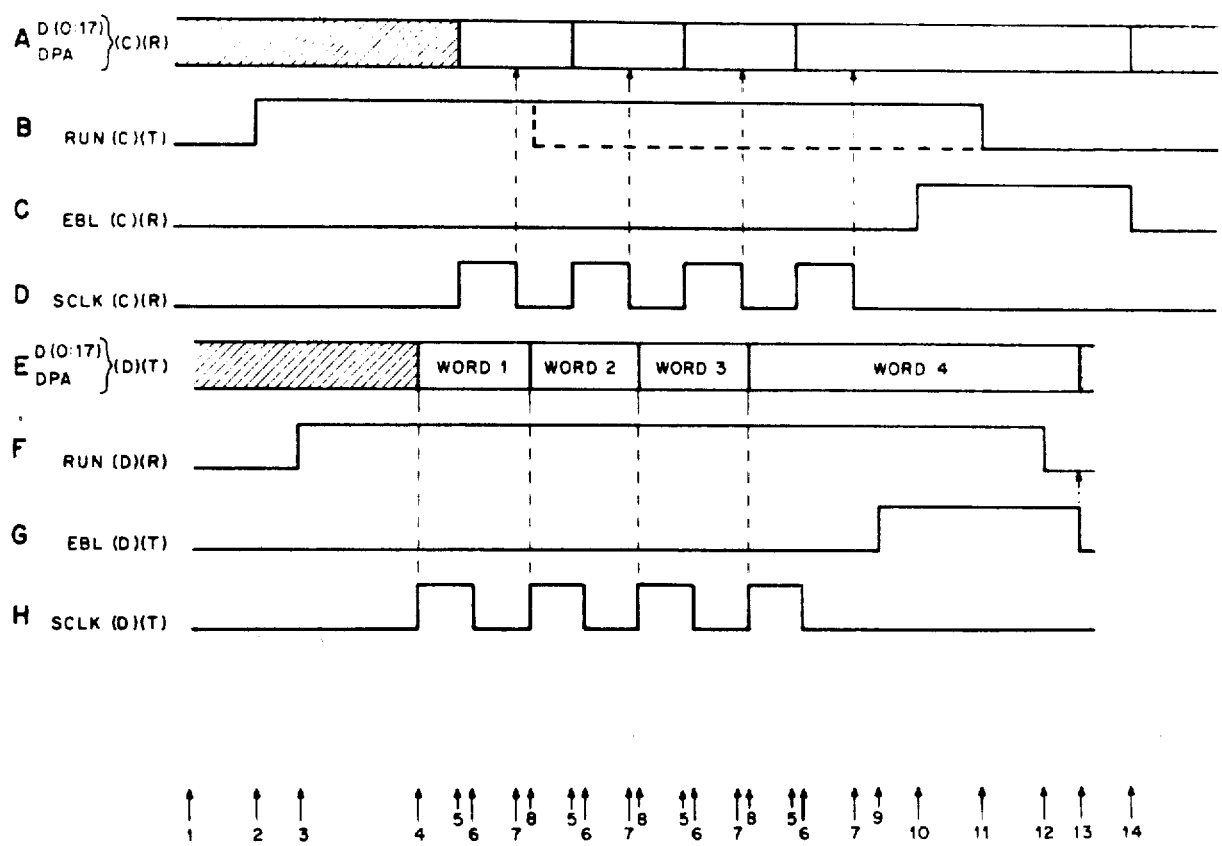
FIG. 17 includes timing charts corresponding to FIG. 16.

As successive words are received at the input buffer 122, they pass in succession into the first-in-first-out memory 123 and, under the internal timing of that memory 123, reach its output. As shown in Chart 17H, the EBL signal has not been received at the controller by time t8 so step 282 branches back to step 270 and the next word on the medium is transferred. For each data word transfer, the drive uses the same sequence at times t8, t5, t6 and t7 as shown in FIG. 17. When the last word in each sector has been transferred, step 282 branches to step 283, and the drive transmits a fixed length (EBL) pulse onto the EBL wire 110 at time t9 (Chart 17G). At time t10 the controller receives the EBL signal (Chart 17C). If the drive word counter register 174 indicates the transfer is to continue for another block, no further action occurs in the controller. When the transfer has been completed, as indicated by an overflow of the register 174, step 284 branches to step 285 and terminates the RUN signal at t11 (Chart 17B).

The EBL signal terminates in step 286 at time t13 (Chart 17G). Termination in the absence of a RUN signal at that time causes step 287 to branch to step 288 and the transfer stops. In step 288 the drive resets the GO bit and sets the DRY bit indicating that the drive is ready to receive another command. If the RUN signal is still asserted at t13, step 287 branches back to step 270 and the next sector is transmitted.

When the EBL signal terminates at t13, it is sensed at the controller at t14 (Chart 17C). If the RUN signal has been terminated, the transfer is finished and step 290 branches to complete the reading operation. Otherwise, the controller is maintained in condition to accept more data.

The EBL signal is relatively prolonged so as to ensure that when a transfer is completed, the RUN signal will terminate before the end of the EBL signal and thereby prevent the drive from cycling through an additional, unneeded block of data.

Normally the input buffer 122, the memory 123 and the output buffer 124 are constructed to store some portion of the words from one sector. As already apparent, however, a given transfer may involve more data words or fewer data words than are present in a sector. When the transfer is for fewer words, the drive word counter register 174, which is incremented in response to each data word transfer from the drive to the controller, produces an overflow which is sensed by an overflow circuit 291 before the EBL signal. However, the data words in the input buffer 122 and memory 123 advance until the first word reaches the output buffer 124, the movement into the output buffer 124, being produced by a memory control circuit 292. When the transfer involves more words than are present in a sector, the control 292 senses when the first word reaches the output buffer.

In either case, the presence of a data word in the output buffer causes the control 292 to activate an interruption control circuit 293 to produce an INTERRUPT signal. This signal interrupts the system and, in response to signals received over a selected one of the buses 120 or 400, transfers the contents of the output buffer 124 through bus receivers/drivers 295 or 402 for storage in a location identified by the bus address register 137. These transfers continue until the word counter register 136 indicates that all the required transfers between the controller and the system have occurred. Then the register 136 overflows and an overflow circuit 294 disables the controls 292 and 293.

Thus, in response to a READ command, the controller and drive transfer the desired number of words from a sector or sectors on the medium onto the synchronous data path and then, using direct access memory procedures, to the system over one of the system buses. The storage facility 123 accommodates the diverse transfer rates. Its size and operation also ensure that there is sufficient data available for efficient transfers to the system. If the system does not retrieve data quickly enough, other circuits in the control 126, which are not shown, sense the arrival of data at the receivers 280 and the full input buffer 122 to set the DLT bit in the control and status register 134 as previously indicated.

B. WRITE Command

During a writing operation data moves from the system over the data section 100 of a device bus to be stored in a designated drive. A WRITE command from the system initiates the transfer after the word counter register 136, bus address register 137, drive word counter register 174 and other of the status and control registers are loaded, as previously indicated. Drive and controller response to WRITE command can be seen by reference to FIGS. 5, 7, 12, 13, 18 and 19.

Initially the interruption control 293 in the controller produces a series of INTERRUPT signals to transfer data as data words during direct memory accesses from one of the system buses 120 or 400 through receiver/drivers 295 or 402 and input multiplexer 281 into the input buffer 122. As the input buffer 122 receives successive data words, the storage control 292 transfers them into the storage facility 123 until the storage facility 123 fills and a data word appears in the output buffer 124 or until the word counter register 136 indicates that all data words to be transferred to the drive are in the controller. In the second case, the data words also shift through the storage facility 123 until the output buffer receives a word.

When the output buffer 124 first receives a data word, the controller may begin a transfer to the drive because the output buffer 124, the storage facility 123 and the input buffer 122 contains a plurality of storage locations. A WRITE signal, produced in response to the FUNCTION bits, enables drivers 297 to load data onto the data set 101 which includes data wires 102 and data parity wire 103. Then the sequence shown in FIGS. 18 and 19 begins.

At time t1 the drive and controller have received the WRITE command (step 300). Between time t1 and time t2, the controller prepares itself and the drive for the data transfer (step 301). At time t2, the controller enables the drivers 297 to load the first word of data onto the data section 101, as shown in Charts 19A and B and in step 302. At the same time, the control 126 transmits a RUN signal onto the RUN wire 107 as shown in step 303 and Chart 19B. The data reaches the drive over the data section 101 at time t3 (Chart 19F). The interval from time t2 to time t3 represents bus transfer delay times.

Figure 18:
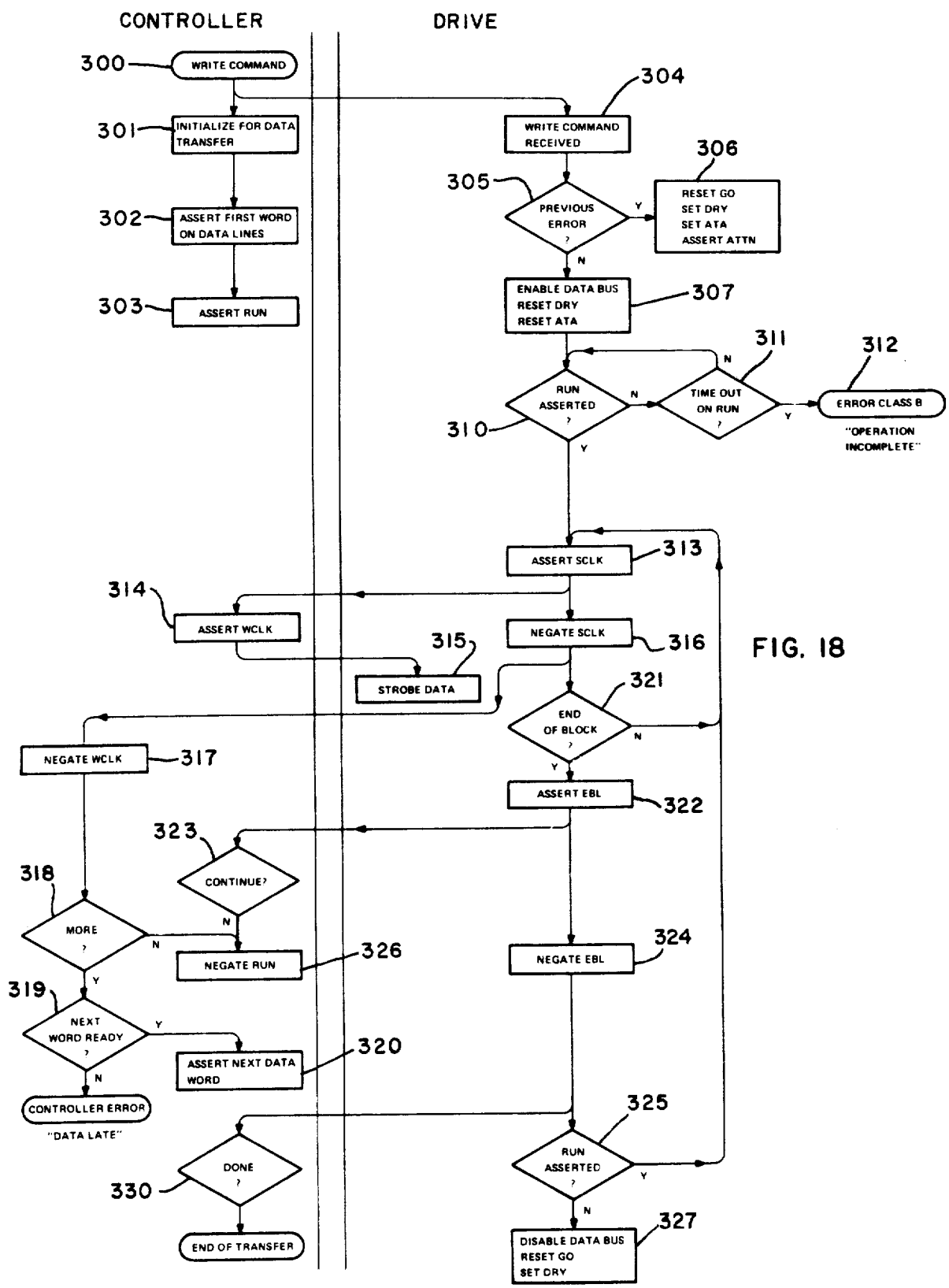
FIG. 18 is a flow chart of the operation of a controller and drive to store data in the drive.
Figure 19:
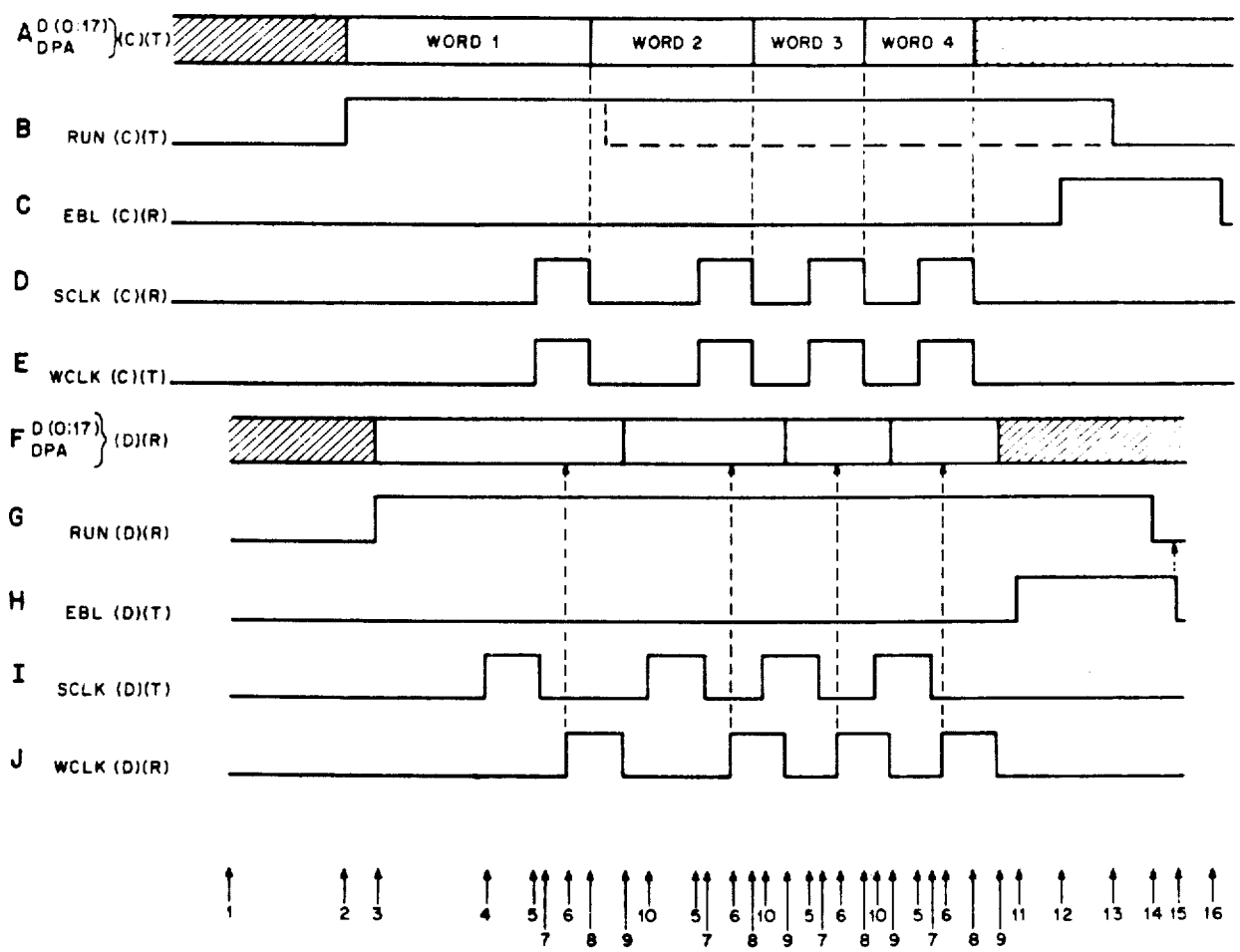
FIG. 19 includes timing charts corresponding to FIG. 18.

Step 304 in FIG. 18 indicates the receipt of the WRITE command 304. Steps 305, 306 and 307 are analogous to steps 254, 255 and 256 in FIG. 16, and they properly condition the contents of the DRY and ATA bit positions in the status register 141, the GO bit position in the control register 140 and the signal on the ATTN wire 94. Like steps 257 and 260 in FIG. 16, steps 310 and 311 insure that the RUN signal on the wire 107 is received within a predetermined time interval to avoid a system malfunction. If a predetermined interval does expire before the RUN signal is asserted (step 312), the OPI bit position in the error register 142 sets.

Normally, however, step 310 branches to step 313 as both the data and RUN signals are received at time t3 (Charts 19F and 19G). At time t4 the drive issues an SCLK pulse on wire 105 as shown in Chart 19I (step 313). The controller receives the SCLK signal on the wire 105 at time t5 and then, at step 312, issues a WCLK signal onto the wire 106 for return to the drive as shown in Charts 19D and E. At time t6, the drive receives the WCLK signal (Chart 19J) and stores on the medium the data from the data section 101 (step 315). At time t7, the drive terminates the SCLK signal (Chart 19I and step 316). This may occur before or after the receipt of the WCLK signal at the drive. The controller stops transmitting the WCLK signal at time t8 (Chart 19F and step 117) in response to the termination of the SCLK signal (Chart 19E). Steps 318 and 319 in FIG. 18 normally branch to step 320 whenever an additional word is in the output buffer 124. If the next word is not in the output buffer, but more words are to be transferred, step 319 branches and sets the DLT bit in the control and status register 134.

Concurrently with steps 317 through 320, the drive performs some control functions. In step 321 the control 126 monitors the drive word counter register 174. If any additional words are to be transferred to the drive, step 321 branches to step 313 and another data word can be stored. The beginning of such a cycle is shown in Chart 19I at time t10 when the drive reasserts the SCLK signal on the wire 105. Subsequently, the times t5, t6, t7, t8, t9 and t10 repeat in sequence until the last word in a block has been transferred.

When the drive receives last word in a sector or block, it transmits an EBL signal onto the wire 110 as represented in step 322 and shown at time t11 in Chart 19H. The controller receives the EBL signal at time t12 (Chart 19C). If, in step 323, the word counter register 136 indicates that additional words are to be transferred from the system, the controller keeps the RUN signal active. Thus, the drive, when it terminates the EBL signal and checks the RUN signal (steps 324 and 325) cycles back to step 313.

When all words have been transferred from the system over the system bus and into the storage facility 123, step 323 branches to step 326 and the RUN signal terminates as shown at time t13 in Chart 19B. The resulting termination is sensed on the wire 107 at time t14 as shown in Chart 19G. As previously indicated, the EBL signal is prolonged so that the RUN signal will always terminate before the EBL signal terminates. The EBL signal at the drive terminates at time t15 as shown in Chart 19H and this transition produces a strobing signal to monitor the RUN signal. As the RUN signal is not asserted, step 325 advances to step 327 to disable the synchronous data section, reset the GO bit in the drive control status register 140 and set the DRY bit in the control and status register 141. At time t16, the controller senses the transition of the EBL signal over the wire 110 and, in step 330, terminates its writing operation.

It is possible that during the transfer operations, the controller will not be prepared to transfer a word through the drivers 297. When this occurs step 319 in FIG. 18 branches and the controller sets a DLT bit position in the control and status register 134.

C. WRITE-CHECK Command

During an operation initiated by a WRITE-CHECK command, circuits in the controller compare the data actually written in a drive with the data contained in the system. This command produces a reading operation at the device bus 121 (FIG. 5) and the data words pass through the input buffer 122, storage facility 123, and output buffer 124. The control 126 also responds to the WRITE-CHECK command by enabling an EXCLUSIVE OR circuit array 298 to receive the data in the output buffer 124 as one input.

When the output buffer 124 contains a word, the interruption circuit 292 generates an INTERRUPT signal to effect a data transfer from locations identified by the contents of the bus address register 317 over one of the system buses 120 or 400 through the receivers/drivers circuits 295 or 402 to be a second input to the EXCLUSIVE OR array 298. If any error exists, then the EXCLUSIVE OR array 298 produces a ONE output which a WRITE-CHECK ERROR circuit 299 monitors. The control circuit 126 may then interrupt subsequent operations.

Otherwise the operation is the same as a READ operation in response to a READ command. Successive words from the drive are transferred over the device bus 121. Corresponding words from the system identified by the bus address register 137 are received over one of the system buses 120 or 400 and through the receiver/driver circuits 295 or 402 as in writing operation except they pass directly to the EXCLUSIVE OR array. The word counter register 136 and drive word counter register 174 will terminate the operations and effectively disconnect the controller and the drive as previously discussed.

D. Detailed Description of Control Circuits

Figure 20A:
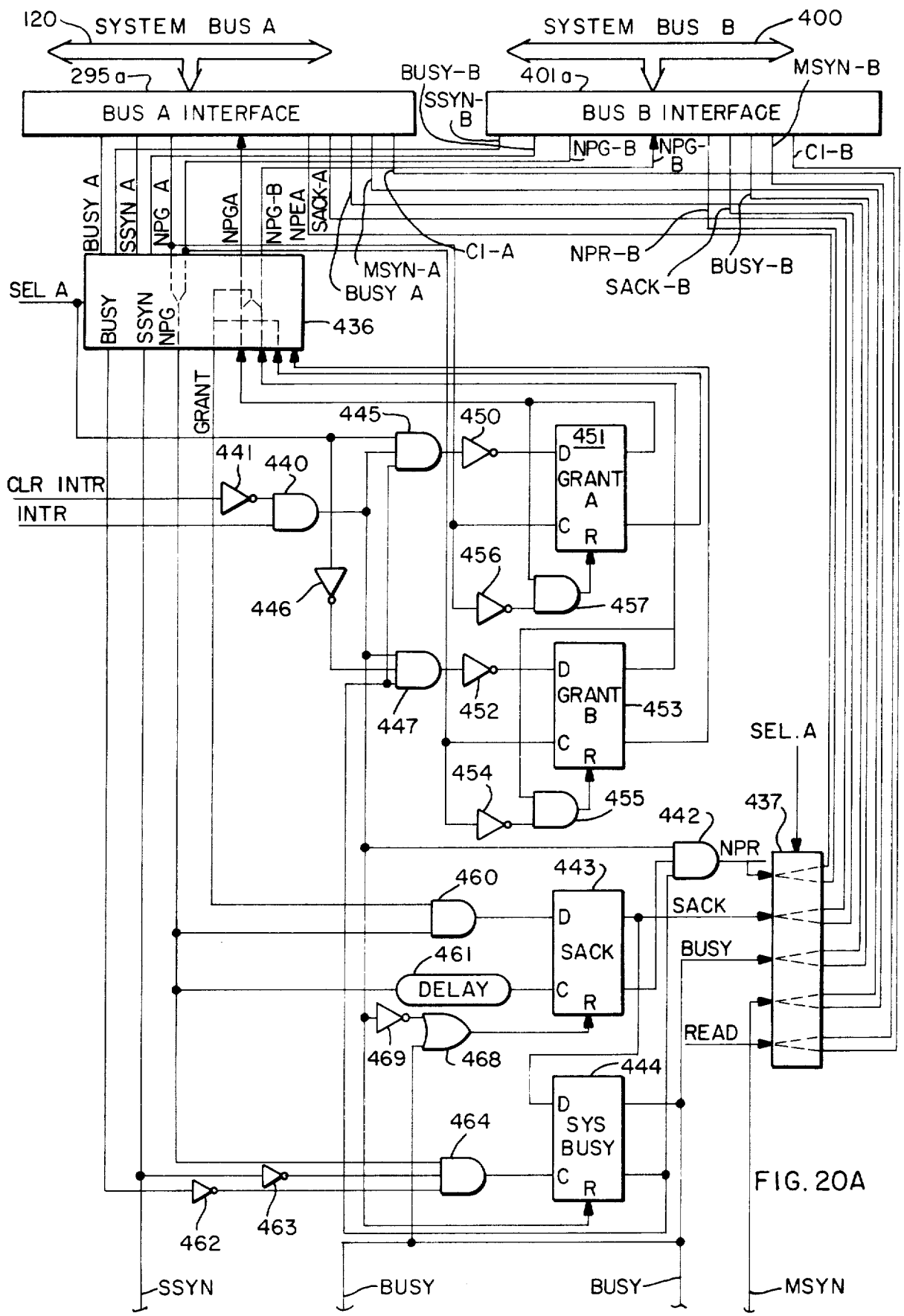
FIG. 20 comprise FIGS. 20A, 20B, 20C and 20D which together constitute a detailed logic diagram of exemblary control circuitry for storing data in accordance with the invention.

I shall now discuss, in detail, the operation of the control circuit 126, shown generally in FIG. 5, which also includes the transfer control circuit 402. A detailed logic circuit is shown in FIGS. 20A, 20B and 20C and 20D. As shown in FIG. 20A, system bus A 120 and system bus B 400 connect respectively to a bus A interface 295a which constitutes a portion of the receivers/drivers 295 shown in FIG. 5 and a bus B interface 401a corresponding to receivers/drivers 401 in FIG. 5. Other portions of the receivers/drivers 295 and 401, shown in FIG. 20D, include a gating A circuit 295b and gating B circuit 401b for coupling data from the output buffer 124 or to the input buffer 122 and a gating A circuit 295c and gating B circuit 401c connected to the output of the address register 137. These four gating circuits in FIG. 20D also are coupled to the system bus A 120 and system bus B 400.

As previously indicated, this invention is directed to operations for routing data, address and control signals to and from an appropriate one of the system buses. The invention itself is applicable to any type of data processing system, but the application of the invention will be clearer if it is described in terms of a specific embodiment. I elect, for purposes of this discussion, to describe the invention in terms of the data processing system described in the previously identified U.S. Pat. No. 3,710,324. The foregoing operations are in response to data transfer commands, such as READ, WRITE and WRITE-CHECK commands as previously discussed. In order to process a data transfer command, there is a transfer of control information to the controller and through the controller to a designated system bus. In order to understand the operation of the circuit shown in FIGS. 20A through 20D, it will be helpful to discuss the READ and WRITE commands in detail. The operation in response to other commands will then be discussed in general terms.

1. READ Command

A READ command is issued to retrieve data from the recording medium in a designated drive and route it to one of the system buses 120 or 400. As previously indicated, a sequence of local and remote register transfers prepares the controller and drive for a reading operation. For example, the two's complement value of the number of words to be transferred is loaded into the word counter register 136 and drive word counter register 174. The initial address of a location coupled to the designated system bus for receiving the data word from the drive is loaded into the bus address register 137.

Further, the desired address on the drive is loaded into the desired track sector register 146. Other registers also receive information depending on the drive. The final register transfer loads the READ command into the control and status register 133 in FIG. 6 and the control and status register 140 in the drive. As shown in FIGS. 12 and 20D a PSEL bit position (i.e., a PSEL flip-flop 402) is either set or reset during this operation. The signal on a data line corresponding to the PSEL bit position is loaded into the PSEL flip-flop 402 when the REG STR pulse energizes an AND gate 403 enabled by the RDY signal and a CS1 in signal. In accordance with the circuits shown in FIG. 20D, the PSEL signal flip-flop 402 sets and transmits a SEL A signal when the PSEL data wire carries a ONE. A ZERO on that wire during the transfer of the READ command would cause the PSEL flip-flop 402 to reset so the SEL A signal would be inactive. In the latter state, the non-asserted SEL A signal would cause the system bus B 400 to be selected Once these operations are complete, the controller resets or clears the RDY signal to indicate that the controller is actively involved in the data transfer and clears the storage facility 123 and the input and output buffers 122 and 124. Then, the controller asserts the RUN signal to begin the data transfer.

Referring now to transfers over the drive bus 121, when the drive begins to send data it also transmits SCLK pulses on wire 105 (FIG. 4). Timing circuits assure that this signal appears within a predetermined interval. When the SCLK pulse terminates, the drive word counter register 174 is incremented and then the circuitry checks an IBUF FULL flip-flop 404 shown in FIG. 20B. The IBUF FULL flip-flop 404 is normally reset indicating that the input buffer is empty. If it were set upon receipt of an SCLK pulse, an error condition would exist. Other circuitry (not shown) produces the DLT signal and TRE signal in response to this error conduction as previously indicated. Then the RUN signal would be disabled and, upon the negation of the EBL signal on wire 110 (FIG. 4) the drive and controller would effectively disconnect.

Figure 20B:
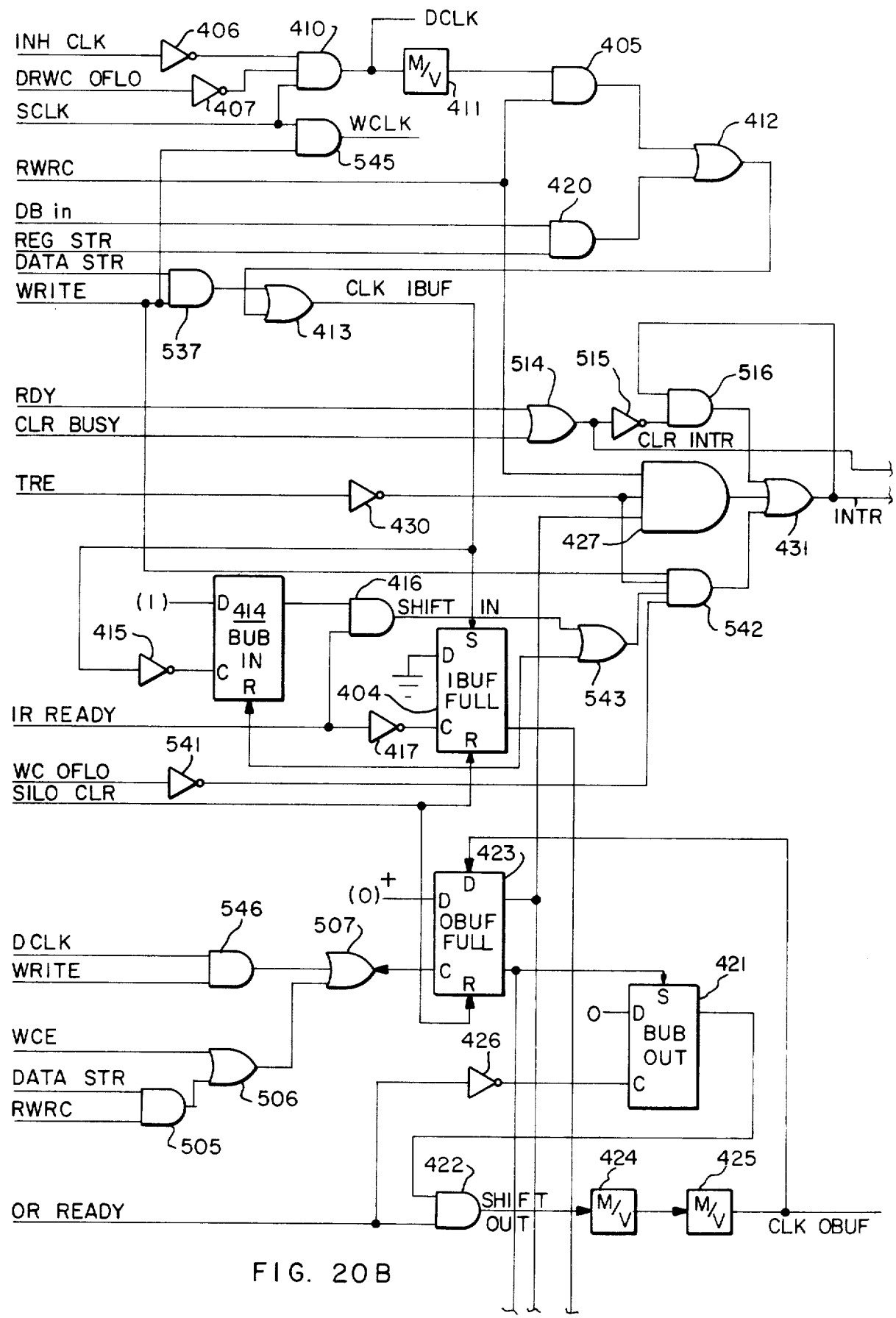

During a reading operation, an RWRC signal, which is active whenever a READ or WRITE-CHECK command is decoded, enables an AND gate 405 (FIG. 20B). Assuming that both a system inhibiting (INHCLK) signal and a DRWC OFLO signal are inactive, inverters 406 and 407 enable an AND gate 410 to pass each incoming SCLK pulse to trigger a monostable (i.e., one-shot) multivibrator 411. The triggering pulses are designated DCLK pulses. Each pulse from the multivibrator 411 passes through the enabled AND gate 405, OR gate 412 and OR gate 413 to serve as a CLK IBUF signal. The leading edge of the CLK IBUF pulse loads data into the input buffer 122 and the CLK IBUF pulse serves as an overriding setting signal to the IBUF FULL flip-flop 404. Thus, the flip-flop 404 sets and removes an overriding resetting signal to a BUB IN flip-flop 414. The trailing edge of the CLK IBUF pulse passes through an inverter 415 to shift the BUB IN flip-flop 414 to a set state thereby enabling an AND gate 416. The other input to the AND gate 416 is an IR READY signal transmitted by the storage facility 123 in FIG. 20D whenever that storage facility 123 has a vacant storage location (i.e., is not full). When this IR READY signal is asserted and the BUB IN flip-flop 414 is set, the AND gate 416 produces a SHIFT IN pulse which loads data from the input buffer 122 into the storage facility 123. As soon as the storage facility receives the data, the IR READY signal terminates, so the SHIFT IN pulse also terminates. The trailing edge of the IR READY signal also passes through an inverter 417 to clock the IBUF FULL flip-flop 404 to a reset condition and thereby reset the BUB IN flip-flop 414 and disable the AND gate 416. Even if the storage facility 123 is not now full, the IR READY signal terminates momentarily so as to initiate this resetting operation. The IBUF FULL flip-flop 404 then indicates the input buffer 122 is empty.

The CLK IBUF pulse may be also be produced during a local register writing operation which identifies the input buffer 122 as the destination of control information from the system bus as previously described. In this instance an AND gate 420 receives the OBin signal and the REG STR signal from the register selection decoder 152 and timing circuit 156, respectively (shown in FIG. 6).

Successive SCLK pulses continue to pass through the AND gate 410 to trigger the multivibrator 411 until the drive word counter register 174 in FIG. 6 overflows and activates the DRWC OFLO signal. This indicates that all the requested data has been read from the drive and causes the inverter 407 to inhibit the AND gate 410. If the DRWC OFLO signal is asserted, other circuits (not shown) terminate the RUN signal and wait for the assertion of the EBL signal. When the EBL signal appears and then terminates, the system effectively disconnects and produces the RDY signal indicating that another transfer can occur. If the INH signal becomes active, further operations are also stopped.

As each word is loaded from the input buffer 122 into the storage facility 123, it passes to an output of the storage facility 123 in response to internal control signals. When a word does reach the output, the storage facility 123 transmits an OR READY signal (FIG. 20B). If a BUB OUT flip-flop 421 is set, an AND gate 422 produces a SHIFT OUT pulse concurrently with the OR READY signal to transfer a word out of the storage facility 123. The BUB OUT flip-flop 421 sets each time an OBUF FULL flip-flop 423 resets indicating the output buffer 124 is empty. This pulse also triggers a monostable multivibrator 424 which in turn triggers another monostable multivibrator 425. The output pulse from the monostable multivibrator 425 directly sets the OBUF FULL flip-flop 423 and loads the output buffer 124. With the flip-flop 423 set, the overriding setting signal to the BUB OUT flip-flop 421 terminates so the termination of the OR READY signal after the transfer to the output buffer 124 passes through an inverter 426 to clock the BUB OUT flip-flop 421 to a reset condition and thereby terminate the SHIFT OUT pulse. At this time, the contents of the word counter register 136 are incremented. When the OBUF FULL flip-flop 423 sets, it also enables an AND gate 427 which is enabled during a reading operation by an RWRC signal when a TRE signal from the control and status register 133 is not active indicating that no transfer error exists through an inverter 430. Thus, when the OBUF FULL flip-flop 423 sets and the AND gate 427 is energized, the resulting signal passes through an OR gate 431 as an INTR signal. This signal then causes an interruption sequence to occur with respect to the appropriate one of the system buses 120 or 400.

Now referring to the interruption and transfer sequence, the PSEL flip-flop 402 in FIG. 20D produces an SEL A signal. This signal enables an AND gate 432 in FIG. 20D and, being passed through an inverter 433, disables an AND gate 434. The AND gate 432 enables the gating A circuit 295b while the AND gate 434, which is enabled when the SEL A signal is not active, enables the gating B circuit 401b. During a reading operation, the READ signal also enables an AND gate 435 to produce a DATA-TO-BUS signal while the controller transmits a BUSY signal. The AND gate 435 energizes the enabled one of the AND gates 432 or 434 to load the data from the output buffer 124 through either the gating circuit 295b or 401b onto the system bus 120 or 400. The SEL A signal also energizes or controls the transfer of signals through a multiplexer circuit 436 and an output circuit 437.

When the circuitry in FIG. 20B produces an INTR signal, it passes through an AND gate 440 (FIG. 20A) normally enabled by an inverter 441 which receives a CLR INTR signal which becomes active at the end of an interruption operation. Thus, the INTR signal passes directly through the AND gate 440 and an AND gate 442 which is enabled with a SACK flip-flop 443 and a SYS BUSY flip-flop 444 are both reset. The resulting NPR signal from the AND gate 442 passes through the gating circuit 437 to be routed either onto an NPR conductor in the system bus 120 or 400 after being coupled through the appropriate interface 295a or 401a depending on the value of the SEL A signal.

As described fully in U.S. Pat. No. 3,710,324, the NPR signal on either of the buses 120 or 400 eventually interrupts operations on that system bus. A priority arbitration circuit (not shown) connected to the selected bus transmits an NPG signal indicating that an NPR request has been granted. As described in the foregoing patent, the NPG signal passes through each device connected to the bus in seriatim to be blodked by the first device which has previously generated an NPR signal.

If the controller is connected to system bus A 120, it is necessary for an NPG signal on system bus 400 to pass directly through the controller back to the system bus B 400. Any NPG signal on the system bus A 120 must also pass through the controller unless an NPR signal was previously transmitted by the controller. As shown in FIG. 20A, when the SEL A signal is asserted, indicating that system bus A 120 is the designated bus, it produces one enabling input signal to an AND gate 445 while an inverter 446 disables an AND gate 447. If no INTR signal has been transmitted and if a SYS BUSY flip-flop 444 is not set, an inverter 450 applies a signal to a GRANT A flip-flop 451 which causes the flip-flop 451 to set in response to an input clocking pulse. On the other hand, the inverter 446 keeps the AND gate 447 disabled so long as the SEL A signal is asserted so an inverter 452 applies a signal to a GRANT B flip-flop 453 which causes the flip-flop 453 to set in response to a clocking input signal.

If the SYS BUSY flip-flop 444 is reset and an NPG signal appears on system bus 400, it will not be passed through the multiplexer 436 due to the asserted state of the SEL A signal. However, it does act as a clocking input to the GRANT B flip-flop 453 which sets on the leading edge of the NPG pulse. The output of the GRANT B flip-flop 453 is coupled back directly through the multiplexer 436 to the bus interface 401a and to the system bus B 400. When the incoming NPG pulse terminates, an inverter 454 becomes active and energizes an AND gate 455 which is enabled whenever the GRANT B flip-flop 453 is set. Thus, the trailing edge of the incoming NPG pulse from the system bus 400 resets the GRANT B flip-flop 453 and terminates the outgoing NPG pluse. In this manner, the SEL A signal, when active, assures that any incoming NPG pulses from system bus B 400 pass directly through the controller and back to the bus.

Likewise, if the SEL A signal is not active, indicating that the system is connected to the system bus 400, the AND gate 445 is disabled so the leading edge of an incoming NPG pulse from the system bus A 120 clocks the GRANT A flip-flop 451 to a set condition. The trailing edge of the NPG pulse then energizes an inverter 456 and an enabled AND gate 457 to reset the GRANT A flip-flop 451 and terminate the NPG pulse which is coupled through the bus interface 295a.

Whenever the system shown in already involved in a transfer, the SYS BUSY flip-flop 444 in FIG. 20A is set, and both the AND gates 445 and 447 are disabled. Thus, any incoming NPG pulse from either system bus A or system bus B is routed back through to the appropriate bus as previously described.

Now assuming that the SEL A signal is asserted and the SYS BUSY flip-flop 444 is reset, the AND gate 445 is enabled while the inverter 446 disables the AND gate 447. If no INTR signal appears, both AND gates 445 and 447 are disabled and NPG pulses pass through the controller. However, the appearance of the INTR signal and energization of the AND gate 440 energizes the AND gate 445 so the inverter 450 produces an input to the GRANT A flip-flop 451 which causes it to remain reset upon the appearance of a clocking input. Thus, when an NPG signal appears on system bus A 120, it does not clock the flip-flop 451 to a set condition. Thus, there is no output signal to be coupled back onto the system bus A 120 and the circuit in FIG. 20A blocks the NPG pulse.

Whenever either of the flip-flops 451 or 453 is reset, the multiplexer 436 produces a GRANT signal which enables an AND gate 460. Thus, if an NPG signal is received from the multiplexer 436 while the selected GRANT A flip-flop 451 is reset, the AND gate 460 conditions the SACK flip-flop 443 to be set upon receipt of the leading edge of an NPG pulse from the multiplexer 436 which passes through a delay signal 461. When the SACK flip-flop 443 sets, it couples a SACK signal through the gating circuit 437 and the bus A interface 295a and onto the system bus A 120. In addition, the SACK signal conditions the SYS BUSY flip-flop 444 to be set. Whenever the INTR signal is asserted, the SYS BUSY flip-flop 444 receives a clocking input in response to the concurrent absence of the BUSY signal from the selected bus, indicated by a signal from an inverter 462 and of a SSYN signal as sensed by an inverter 463. If the SACK flip-flop 443 is set, the output from an AND gate 464 clocks the SYS BUSY flip-flop 443 to a set condition and transmits the BUSY signal to the gating circuit 437 back onto the system bus A. This, as described in the foregoing U.S. Pat. No. 3,710,324, enables the controller to control a data transfer to the location on the system bus A 120 addressed by the bus address register 137 shown in FIG. 20D.

Still referring to FIG. 20A, setting the SYS BUSY flip-flop 444 also energizes an OR gate 468 to provide an overriding resetting input to the SACK flip-flop 443. The SACK flip-flop 443 also is maintained in a reset condition whenever the AND gate 440 which is connected to the other input of the OR gate 464.

Figure 20C:
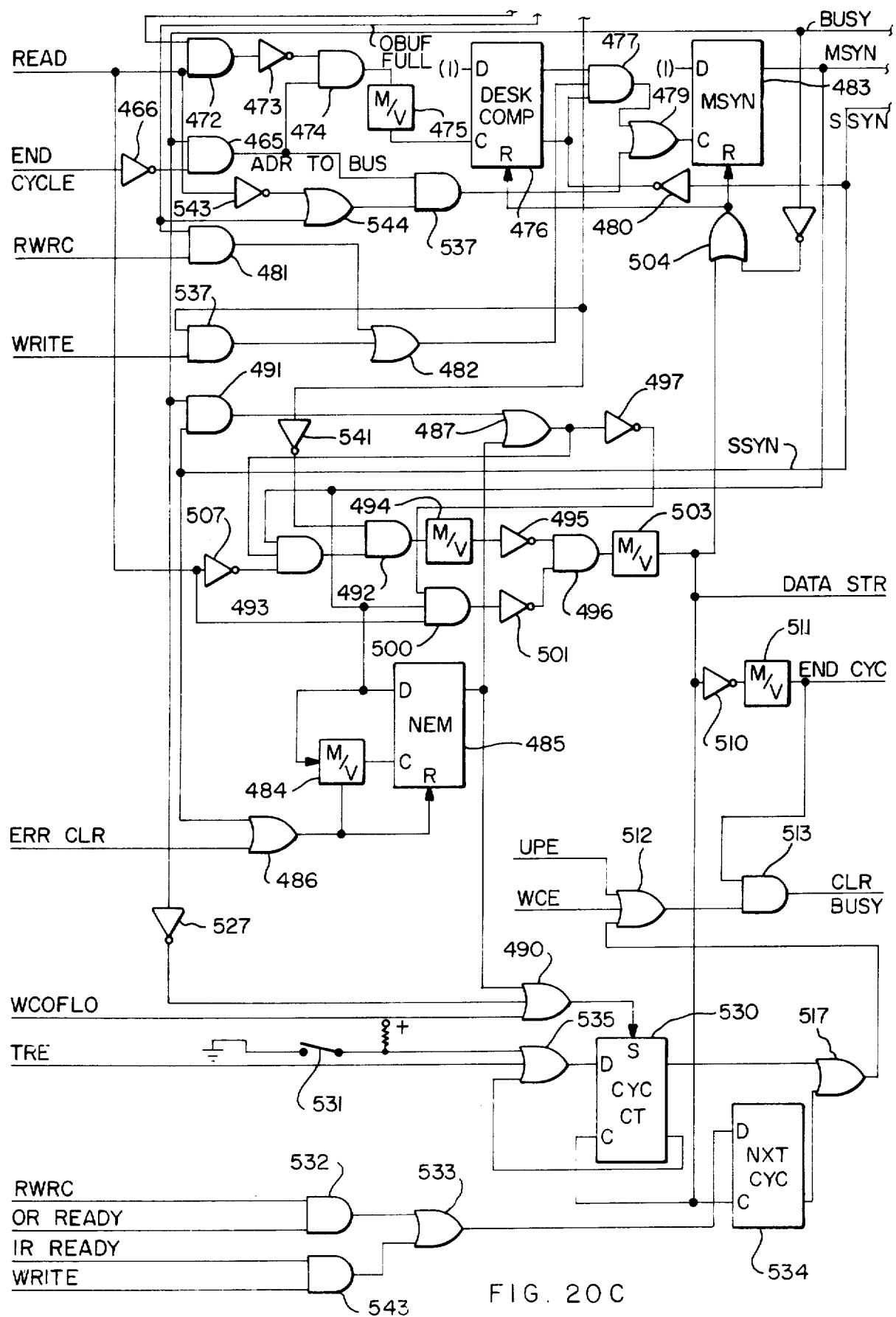
Figure 20D:
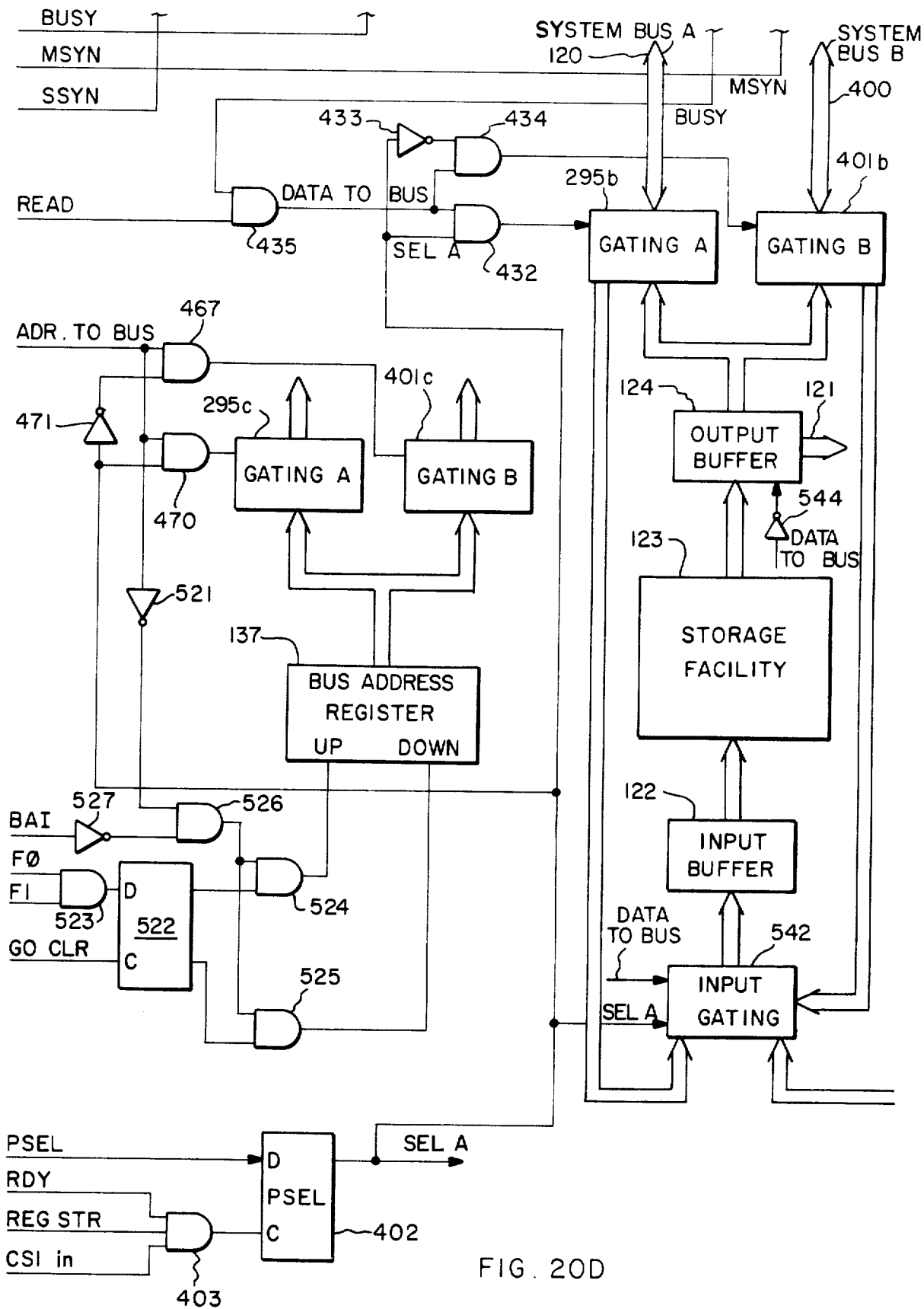

With the SYS BUSY flip-flop 444 set, an AND gate 465 in FIG. 20C generates an ADR TO BUS signal because an END CYC pulse, when inactive, enables the AND gate 465 through an inverter 466. The END CYC pulse is described later. The ADR TO BUS signal enables AND gates 467 and 470 in FIG. 20D. With the PSEL flip-flop 402 set, the AND gate 470 is enabled while an inverter 471 disables the AND gate 467. As a result, the output of the bus address register 137 is coupled through the gating circuit 295c onto the system bus A 120. As apparent, if the PSEL flip-flop 402 is reset, the AND gate 467 is enabled and the bus address passes through the gating circuit 401c to the system bus B 400. Direction control signals to determine whether a reading or writing operation will be performed over the system bus are also transmitted in response to a READ signal applied to the output circuit 437.

Whenever the OBUF FULL flip-flop 423 in FIG. 20B sets during a drive reading operation, an AND gate 472 in FIG. 20C is disabled so an inverter 473 enables an AND gate 474. Each time the AND gate 465 produces an ADR TO BUS signal, the AND gate 474 triggers a monostable multivibrator 475 which, after a time delay, clocks a DESK COMP flip-flop 476 to a set condition thereby providing one enabling input to an AND gate 477. The time delay enables the data signals on the designated system bus to settle. A second enabling input is provided by an inverter 480 whenever an SSYN signal is not active.

During a reading or write-checking operation, the RWRC signal also enables AND gate 481. Whenever the OBUF FULL flip-flop 423 in FIG. 20B sets, data is available for transfer and produces a signal which energizes the AND gate 477, through an OR gate 482, thereby to clock an MSYN flip-flop 483 to a set condition. The resulting signal is coupled through the output gating circuit 437 in FIG. 20A and onto the selected bus in response to the SEL A signal. This indicates that data is on the system bus.

To prevent a malfunction of the controller should the addressed location be inoperative, the MSYN signal triggers a monostable multivibrator 484 which clocks an NEM flip-flop 485 if the MSYN signal still appears after a time interval. Normally the SSYN signal appears and passes through an OR gate 486 to disable the multivibrator 484 and produce an overriding resetting signal to the flip-flop 485. If the flip-flop 485 should set, it energizes an OR gate 487 and OR gate 490 to terminate further operations; in this type of error condition an ERR CLR signal produced in response to a new function or a clearing command resets the flip-flop 485 and disables the multivibrator 484.

During a normal transfer in response to a READ command, the SSYN signal does appear while the controller is making a transfer, an AND gate 491 energizes the OR gate 487. AND gates 492 and 493 are disabled during a READ command so a monostable multivibrator 494 is inactive and an inverter 495 enables an AND gate 496. Prior to the arrival of the SSYN signal, an inverter 497 enabled an AND gate 500 so the AND gate 500 and an inverter 501 disabled the AND gate 496. With the appearance of the SSYN signal, however, the AND gate 500 is disabled so the AND gate 496 triggers a monostable multivibrator 503 to produce a DATA STR pulse and reset the MSYN flip-flop 483 through an OR gate 504.

During a READ command the DATA STR pulse energizes an AND gate 505 and OR gates 506 and 507 in FIG. 20B to clock the OBUF FULL flip-flop 423 to a reset condition. This sets the BUB OUT flip-flop 421 to permit the next word to pass into the output buffer 124 as previously described. When the DATA STR pulse terminates, an inverter 510 (FIG. 20C) triggers a monostable multivibrator 511 to produce the END CYC pulse. If an OR gate 512 is energized by OR gate 517, an AND gate 513 couples the END CYC pulse as a CLR BUSY pulse.

The CLR BUSY signal passes through an OR gate 514 as the CLR INTR pulse in FIG. 20B so an inverter 515 disables an AND gate 516 which provides a latching feedback path for the OR gate 431. This terminates the INTR signal until the OBUF FULL flip-flop 423 sets again. Each time the RDY signal is transmitted, it also energizes the OR gate 514. In addition, the END CYCLE pulse disables the AND gate 465 to terminate the ADR TO BUS signal momentarily. This removes the address and direction control signals from the system bus while the ADR TO BUS signal is disabled. An inverter 521 on FIG. 20D provides an incrementing or decrementing pulse to the bus address register 137. As shown in FIG. 20D, a flip-flop 522 receives information in response to a GO CLR signal generated when a transfer command is loaded. If particular function bit positions (e.g., F0 and F1 bit positions) are both set, the bus address register is to be incremented to identify successive locations. Some transfer commands may more appropriately load data in a reverse direction. If that occurs, an AND gate 523 is not energized. Thus, when a command is loaded, the flip-flop 522 will set if the contents of the bus address register are to be incremented during each successive transfer. The set and reset outputs from the flip-flop 522 are received by AND gates 524 and 525 respectively. When the ADR TO BUS signal becomes inactive, an AND gate 526 is energized by an inverter 527 if the BAI bit position in the control and status register 134 is reset. The resulting pulse passes through the enabled one of the AND gates 524 or 525 to alter the bus address register 137.

The controller may transmit one data word each time it transmits an NPR pulse as is the normal transfer procedure for other units. During a reading operation, however, it is desirable to keep the storage facility 123 as empty as possible. As apparent, the system may suddenly receive interruptions of a higher priority which do not enable a transfer of data from the output buffer. If the storage facility 123 is kept relatively empty, more transfers from the drive can be buffered before an error condition exists. In accordance with another aspect of this invention, the controller may transfer two data words during each interruption operation. Referring to FIG. 20C, whenever the SYS BUSY flip-flop 444 is reset, an inverter 527 energizes the OR gate 490 to provide an overriding setting signal to a CYC CT flip-flop 530. During a transfer operation, the SYS BUSY flip-flop 444 (FIG. 20A) sets. If the NEM flip-flop 485 remains reset and a WC OFLO signal is inactive, the overriding setting signal is removed. Each DATA STR pulse constitutes a clocking pulse to the flip-flop 530. If a switch 531 is closed and no TRE signal is present, the clocking pulse reverses the state of the flip-flop 530 and resets it thereby disabling one input to the OR gate 517. If an AND gate 532 is energized, indicating another word can be transferred, then an OR gate 533 conditions a NXT CYC flip-flop 534 to be set. When the CYC CT flip-flop 530 is reset and the NEXT CYC flip-flop 534 simultaneously is set, the OR gate 517 is not enerized so neither the CLR BUSY nor CIR INTR pulses are generated. Thus, after the END CYC pulse terminates, another transfer operation can occur as soon as the OBUF FULL flip-flop 423 sets. When the DATA STR pulse is now generated after this cycle, however, the CYC CT flip-flop 530 sets thereby energizing the OR gates 517 and 512. Then the AND gate 513 can transmit the CLR BUSY pulse.

It will be apparent, from FIG. 20C, the appearance of a UPE or WCE signal indicating the corresponding error conditions as previously described also energize the OR gate 512 to produce the CLR BUSY signal immediately upon the receipt of the END CYC pulse. Thus, the CYC CT flip-flop 530 and NXT CYC flip-flop 534 enable two transfer operations during one interruption operation.

If the system bus B 400 is connected to other units which cannot control data transfers or are of a very low priority, another signal could be applied to an OR gate 535 so as to maintain the CYC CT flip-flop 536 in a reset condition. Thus, assuming that the intervals between successive DATA STR pulses weresufficiently long enough to enable the storage facility 123 to provide every word, an entire block of data could be transferred onto the system bus B 400 without interruption. Normally this would not be done with system bus A 120 or any bus which has other devices with other units because these block transfers require disproportionately long intervals.

These transfer operations continue until all the words to be read are transferred to the system. Then the WC OFLO signal is generated as the word counter register 136 is incremented. When this occurs, the OR gate 490 in FIG. 20C sets the CYC CT flip-flop so the next END CYC pulse produces the CLR BUSY and CLR INTR pulses. If a word is not available at the output of the facility 123, the OR READY signal does not appear at the time of the DATA STR pulse so the AND gate 532 and OR gate 533 conditions the NXT CYC flip-flop 534 to reset. This energizes the OR gates 517 and 512 so the END CYC pulse produces the CLR BUSY pulse.

Thus, the circuitry in FIGS. 20A through 20D during a reading operation accepts data from a drive and transfers it to the input buffer and through the storage facility 123 to the output buffer 124. Data is then routed to a system bus depending upon the contents of the PSEL bit position in the data transfer command.

2. Writing Operation

During a writing operation, data is supplied from the selected one of system buses 120 or 400 to the input buffer 122 in response to a WRITE command. Initially, local and remote register transfers load the number of words to be transferred into the word counter register 136 and drive word counter register 174 and the starting memory location into the bus address register 137. Other information concerning the starting location in the drive to receive the data is also provided. Then the system loads a WRITE command containing appropriate function bits and a ONE in the GO bit position. In response to this, a RDY signal terminates and the contents of the storage facility 123 and other related circuits are cleared. The initial data transfer during a writing operation occurs between selected system bus 120 or 400 and the controller. When the WRITE signal is generated, it enables an AND gate 537 in FIG. 20B. The coincidence of the WRITE signal, the absence of a WC OFLO signal signified by an assertive signal from an inverter 541 indicating more words are to be transferred and the output from the inverter 430 indicating no transfer errors occur, initially energize an AND gate 542 and the signal from an OR gate 543 produced when the IBUF FULL flip-flop 404 is reset produces an INTR signal at the output of the OR gate 431. The resulting INTR signal produces an NPR signal from the output of an AND gate 442 in FIG. 20A which is routed through the gating circuit 437 in response to the SEL A signal as previously described. Then the circuitry shown in FIG. 20A reacts in response to the incoming NPG signal from the selected bus by setting the SACK flip-flop 443 and, upon the release of the selected bus, by taking control of the bus by setting the SYS BUSY flip-flop 444 and resetting the SACK flip-flop 443.

During a writing operation, the READ signal is not asserted. Thus, the AND gate 472 in FIG. 20C is never energized. Under these conditions the inverter 473 enables an AND gate 474 to pass the ADR TO BUS signal and trigger the multivibrator. Thus, when the SYS BUSY flip-flop 444 in FIG. 20A sets, indicating the controller has control of the system bus, and any prior END CYC signal terminates, the AND gate 465 energizes the AND gate 474 and triggers the multivibrator 475 thereby clocking the DESK COMP flip-flop 471 to a set condition. Assuming that an SSYN signal has previously been terminated, the inverter 480 provides a second enabling input to the AND gate 477. With the IBUF FULL flip-flop 412 in FIG. 20B reset, the output of an AND gate 537, which is enabled by the WRITE signal, produces a third enabling signal through the OR gate 482 to clock the MSYN flip-flop 483 to a set condition. As previously indicated, if no SSYN signal is received from the designated bus after a predetermined time, the multivibrator 484 clocks the NEM flip-flop 485 to a set condition and the operation subsequently terminates with a nonexistent memory error. The timely receipt of an SSYN signal however, disables the multivibrator 484 and provides an overriding resetting signal to the NEM flip-flop 485.

The output from the SYS BUSY flip-flop 444 and the SSYN signal energize an AND gate 491 to provide one enabling input to an AND gate 493. An inverter 507 provides a second enabling input so the MSYN signal from the set flip-flop 483 energizes the AND gate 493 and triggers the multivibrator 494 when the IBUF FULL flip-flop 412 is reset. An inverter 541 indicates a reset IBUF FULL flip-flop 404. The inverter 495 disables the AND gate 496 and then triggers the multivibrator 503 to produce the DATA STR signal.

The DATA STR pulse energizes the AND gate 537 to produce the CLK IBUF pulse and the OR gate 504 to terminate the MSYN signal. Referring to FIG. 20D, the selection from one of the gating circuits 295b or 401b is made in an input gating circuit 542 in response to the SEL A signal and a non-asserted DATA-TO-BUS signal. The termination of the CLK IBUF signal passes through the inverter 415 in FIG. 20B to set the BUB IN flip-flop 414 as setting of the IBUF FULL flip-flop 404 removes the overriding resetting signal from the BUB IN flip-flop 414. When the IR READY signal indicates that the input to the storage facility 123 in FIG. 20D can accept new data, the AND gate 416 in FIG. 20B produces the SHIFT IN pulse so another transfer can occur. If the INTR signal has been disabled, this enables a new INTR signal Referring to FIG. 20C, if the storage facility has additional space, the IR READY signal will reappear and together with the WRITE signal, energize another AND gate 543. 20C. This produces the same basic operation as during a READ operation if it is desired to couple a pair of words into the input buffer during a writing operation. While it is desirable to keep the storage facility as empty as possible during a reading operation, it is desirable to keep the storage facility 123 as full as possible during a writing operation.

Although not disclosed in any FIGURES, it is sometimes desirable to amass a number of words in the storage facility 123 before starting an actual writing operation over the data bus. A counter might be cleared on receiving a WRITE or WRITE-CHECK operating command to generate subsequently a START signal after the facility 123 receives a predetermined number of words, an indication that all the words to be transferred have been loaded into the storage facility 123, or an indication that a transfer error has occurred. Then a START signal would be generated to initiate a transfer into the system.

Still referring to the interaction between system and the controller during a writing operation, the DATA STR signal also produces the END CYCLE pulse and CLR BUSY pulse with the same results as previously discussed.

Now referring to the transfer of data from the output buffer, the output buffer 124 in FIG. 20B receives the DATA-TO-BUS signal from the AND gate 435 which passes through an inverter 544 to route data from the output buffer onto the device bus 121. When the data being loaded into the storage facility from the system bus is ready for a transfer to the output buffer 124, the OR READY signal energizes the AND gate 422 in FIG. 20B to shift the data out and trigger the multivibrators 424 and 425 thereby set the OBUF FULL flip-flop 423. When this is done and the START signal is generated, the controller generates the RUN signal which enables the drive to transmit SCLK pulses back to the controller. These pulses are applied to an AND gate 545 in FIG. 20B to be transferred back to the drive as WCLK pulses. The appearance of each DCLK pulse from the AND gate 410 during a writing operation causes an AND gate 546 to pass the DCLK pulse to the OR gate 507 to clock the OBUF FULL flip-flop 423 to a reset condition thereby setting the BUB OUT flip-flop 421 and loading data from the output buffer onto the data lines in the device bus 121 with the WCLK pulse. When the SCLK pulse terminates and the OBUF FULL flip-flop 423 is reset to set the BUB OUT flip-flop 421, the drive word counter register 174 can be incremented. If additional words are to be transferred, the next appearance of the OR READY signal will again set the OBUF FULL flip-flop 423 to repeat the process. If the OR READY signal is not asserted, then a DLT and TRE signals are asserted so that the termination of the next SCLK pulse loads ZEROES onto the data lines and terminates the RUN signal. When a normal transfer terminates, the DRWC OFLO signal disables the AND gate 410 so no DCLK pulses are produced. Subsequent locations in the drive are loaded with ZEROES until the RUN signal terminates and the EBL signal is asserted by the drive. Then the drive and controller effectively disengage from each other to terminate the operation.

Thus, during a writing operation, data moves from locations on a selected system bus determined by the output of the PSEL flip-flop 402 into the input buffer 122 through input gating circuit 543. The words may then be transferred into the drive from the output buffer 124.

3. WRITE-CHECK operations

During the WRITE-CHECK operation, the system provides data in accordance with a writing operation while the drive provides data in accordance with the reading operation. Thus, the AND gate 435 in FIG. 20D does not generate a DATA-TO-BUS signal during a write-check operation, so the data from the drive passes to the input buffer 122. In other areas, distinctions are made between a reading operation identified by a READ signal and a reading or write-checking operation either of which produces the RWRC signal. For example, the procedure for clocking the MSYN flip-flop 483 in FIG. 20C is the same for both reading and write-checking operations as is the control of the number of transfers which occur during any given interrupt with respect to the operation of the flip-flops 530 and 534.

This invention has thus been discussed in terms of a specific data processing system and in terms of three specific data transfer commands for performing reading, writing or write-checking operations. Other analogous data transfer commands for reading data or writing data in a reverse mode can also be implemented. Thus, the disclosure is by way of example only. It is realized that many of the circuits including the detailed circuits of FIGS. 20A through 20D may be modified extensively while still performing the same basic operation as those disclosed. Specifically, other circuits will obviously be useful in different systems for generating the INTR signal which produces a data transfer and further, other circuits would be useful in performing the bus selection operation. Therefore, it is the object of the appended claims to cover all such variations and modifications as come within the spirit and scope of this invention.

What I claim as new and desire to secure by Letters Patent of the United States is:

1. A controller for a secondary storage facility in a data processing system, said controller being adapted for connection to first and second system buses connected to addressed storage locations and at least one drive including direct access storage means and said controller comprising:
   A. buffer storage means for data,
   B. means for transmitting address signals for identifying an addressed storage location connected to a system bus,
   C. means for transmitting control signals for effecting a system bus data transfer between said controller and the system buses
   D. means for transferring data between a drive and said buffer storage means,
   E. register means for assuming at least two states,
   F. first routing means connected to said address signal transmitting means, said control signal transmitting means and said buffer storage means for transferring address signals to and control signals and data to and from the first system bus in response to a first state of said register means, and
   G. second routing means connected to said address signal transmitting means, said control signal transmitting means and said buffer storage means for transferring address signals to and control signals and data to or from the second system bus in response to a second state of said register means.

2. A controller as recited in claim 1 including means for receiving control information and means responsive to the receipt of control information for establishing a state of said register means for an ensuing data transfer.

3. A controller as recited in claim 1 wherein said control signal transmitting means includes
   i. monitoring means for indicating whether said buffer storage means is conditioned for a data transfer to or from a selected system bus,
   ii. means for transmitting an interruption request signal to initiate a data transfer operation over a selected system bus,
   iii. means for transmitting a data strobing signal during each system bus data transfer operation in response to a control signal from the selected system bus,
   iv. means for terminating the interruption request signal in response to a signal from said data strobing signal transmitting means, and
   v. means responsive during a first data strobing signal after an interruption request signal for being activated to disable said terminating means when said monitoring means indicates said buffer storage means is conditioned for a system bus data transfer.

4. A controller as recited in claim 3 wherein said control signal transmitting means includes monitoring means responsive to error conditions during a data transfer to or from the selected system bus or a drive and error means responsive to said monitoring means for transmitting an error signal, said disabling means being deactivated in response to the error signal to cause the interruption request signal and further data transfers to be terminated.

5. A controller as recited in claim 3 additionally including
   i. counter means for producing a count signal after a succession of system bus data transfers, said disabling means being deactivated in response to the count signal, and
   ii. means for resetting said counter means to a reference value each time said termination means terminates an interruption request signal.

6. A controller as recited in claim 5 additionally comprising
   i. means for disabling said counter means to thereby enable a succession of system bus data transfers, and
   ii. means for indicating the completion of the system bus data transfers for deactivating said disabling means to thereby terminate transfers over the selected bus.

7. A controller as recited in claim 3 additionally including counter means responsive to a second data strobing signal in succession after an interruption request signal is transmitted for deactivating said disabling means to thereby enable each interruption request signal to effect a two data transfer.

8. A controller for a secondary storage facility in a data processing system, said controller being adapted for connection to a system bus and to at least one drive including direct access storage means and said controller comprising:
   A. buffer storage means for data,
   B. means for transferring data between the drive and said buffer storage means, and
   C. means for transferring data between said buffer storage means and the system bus including:
      i. monitoring means for indicating whether said buffer storage means is conditioned for a data transfer to or from the system bus,
      ii. means for transmitting an interruption request signal to initiate a data transfer operation over the system bus,
      iii. means for transmitting a data strobing signal during each system bus data transfer operation in response to a system bus control signal,
      iv. means for terminating the interruption request signal in response to a signal from said data strobing means, and
      v. disabling means responsive during a first data strobing signal after an interruption request signal is transmitted for being activated to disable said terminating means when said monitoring means indicates said buffer storage means is conditioned for a data transfer.

9. A controller as recited in claim 8 wherein said data transferring means additionally includes means for monitoring error conditions during a data transfer to or from the system bus or a drive and error means responsive to said monitoring means for transmitting an error signal, said disabling means being deactivated in response to the error signal to cause the interruption request signal and further system bus data transfers to be terminated.

10. A controller as recited in claim 8 additionally including
    i. counter means for producing a count signal after a succession of system bus data transfers, said disabling means being deactivated in response to the count signal, and
    ii. means for resetting said counter means to a reference value each time said termination means terminates an interruption request signal.

11. A controller as recited in claim 8 additionally including counter means responsive to a second data strobing signal in succession after an interruption request signal is transmitted for deactivating said disabling means, said data transferring means thereby being enabled to effect two data transfers in response to each interruption request signal.

12. A data processing system comprising:
    A. first and second system buses for transferring address, control and data signals,
    B. addressed storage locations connected to each of said first and second system buses,
    C. a plurality of direct access storage units for storing data, and
    D. a controller coupling selectively said first and second buses and at least one said direct access storage units for controlling data transfers between said addressed storage locations connected to a selected one of said buses and one of said direct access storage units, said controller including:
       i. buffer storage means for data,
       ii. means for transmitting address signals for identifying an addressed storage location on a system bus,
       iii. means for transmitting control signals for effecting a system bus data transfer between said controller and system bus,
       iv. means for transferring data between one of said direct access storage units and said buffer storage means, and
       v. register means for assuming at least two states, vi. first routing means connected to said address signal transmitting means, said control signal transmitting means and said buffer storage means for transferring address signals to and control signals and data to and from the first system bus in response to a first state of said register means, and vii. second routing means connected to said address signal transmitting means, said control signal transmitting means and said buffer storage means for transferring address signals to and control signals and data to or from the second system bus in response to a second state of said register means.

13. A system as recited in claim 12 including means in said system for transmitting control information to said controller and means in said controller responsive to the receipt of control information for establishing a state of said register means for an ensuing data transfer.

14. A system as recited in claim 12 wherein said control signal transmitting means includes
   a. monitoring means for indicating whether said buffer storage means is conditioned for a data transfer to or from a selected system bus,
   b. means for transmitting an interruption request signal to initiate a data transfer operation over a selected system bus,
   c. means for transmitting a data strobing signal during each system bus data transfer operation in response to a control signal from the selected system bus,
   d. means for terminating the interruption request signal in response to a signal from said data strobing signal transmitting means, and
   e. means responsive during a first data strobing signal after an interruption request signal for being activated to disable said terminating means when said monitoring means indicates said buffer storage means is conditioned for a data transfer.

15. A system as recited in claim 14 wherein said control signal transmitting means includes means for monitoring error conditions during a data transfer to or from a system bus or one of said storage units and means responsive to said monitoring means for transmitting an error signal, said disabling means being deactivated in response to the error signal to cause the interruption request signal and further data transfers to be terminated.

16. A system as recited in claim 14 additionally including
   a. counter means in said controller for producing a count signal after a succession of system bus data transfers, said disabling means being deactivated in response to the count signal, and
   b. means in said controller for resetting said counter means to a reference value each time said termination means terminates an interruption request signal.

17. A system as recited in claim 16 additionally comprising
   a. means responsive to one state of said register means for disabling said counter means to thereby enable a succession of system bus data transfers, and
   b. means for indicating the completion of the data transfers for deactivating said disabling means to thereby terminate transfers over the selected bus.

18. A system as recited in claim 14 additionally including counter means in said controller responsive to a second data strobing signal in succession after an interruption request signal is transmitted for deactivating said disabling means to thereby enable each interruption request signal to effect a two data transfer.

19. A data processing system comprising
   A. a system bus for transferring address, control and data signals,
   B. addressed storage locations connected to said system bus,
   C. a plurality of direct access storage units for storing data, and
   D. a controller for coupling said system bus and at least one of said direct access storage units for controlling data transfers between said addressed storage locations and one of said direct access storage units, said controller including:
      i. buffer storage means for data,
      ii. means for transferring data between one of said memory units and said buffer storage means, and
      iii. means for transferring data between said buffer storage means and said system bus including:
         a. monitoring means for indicating whether said buffer storage means is conditioned for a data transfer to or from said system bus,
         b. means for transmitting an interruption request signal to initiate a data transfer operation over said system bus,
         c. means for transmitting a data strobing signal during each data transfer operation in response to a system bus control signal,
         d. means for terminating the interruption request signal in response to a signal from said data strobing means, and
         e. disabling means responsive during a first data strobing signal after an interruption request signal is transmitted for being activated to disable said terminating means when said monitoring means indicates said buffer storage means is conditioned for a data transfer.

20. A system as recited in claim 19 wherein said data transferring means additionally includes means for monitoring error conditions during a data transfer to or from said system bus or said storage unit and error means for transmitting an error signal, said disabling means being deactivated in response to the error signal to cause the interruption request signal and further data transfers to be terminated.

21. A system as recited in claim 19 additionally including
   i. counter means in said controller for producing a count signal after a succession of system bus data transfers, said disabling means being deactivated in response to the count signal, and
   ii. means in said controller for resetting said counter means to a reference value each time said termination means terminates an interruption request signal.

22. A controller as recited in claim 19 additionally including counter means in said controller responsive to a second data strobing signal in succession after an interruption request signal is transmitted for deactivating said disabling means, said data transferring means thereby being enabled to effect two system bus data transfers in response to each interruption request signal.

* * * * *